US011222634B2

(12) United States Patent
Sugiyama et al.

(10) Patent No.: US 11,222,634 B2
(45) Date of Patent: Jan. 11, 2022

(54) DIALOGUE METHOD, DIALOGUE SYSTEM, DIALOGUE APPARATUS AND PROGRAM

(71) Applicants: NIPPON TELEGRAPH AND TELEPHONE CORPORATION, Chiyoda-ku (JP); OSAKA UNIVERSITY, Suita (JP)

(72) Inventors: Hiroaki Sugiyama, Soraku-gun (JP); Hiromi Narimatsu, Soraku-gun (JP); Yuichiro Yoshikawa, Suita (JP); Takamasa Iio, Suita (JP); Tsunehiro Arimoto, Suita (JP); Hiroshi Ishiguro, Suita (JP)

(73) Assignees: NIPPON TELEGRAPH AND TELEPHONE CORPORATION, Chiyoda-ku (JP); OSAKA UNIVERSITY, Suita (JP)

( * ) Notice: Subject to any disclaimer, the term of this patent is extended or adjusted under 35 U.S.C. 154(b) by 115 days.

(21) Appl. No.: 16/491,442

(22) PCT Filed: Jan. 26, 2018

(86) PCT No.: PCT/JP2018/002509
§ 371 (c)(1),
(2) Date: Sep. 5, 2019

(87) PCT Pub. No.: WO2018/163647
PCT Pub. Date: Sep. 13, 2018

(65) Prior Publication Data

US 2020/0013404 A1 Jan. 9, 2020

(30) Foreign Application Priority Data

Mar. 10, 2017 (JP) ............................ JP2017-046366

(51) Int. Cl.
*G10L 15/22* (2006.01)
*G10L 15/18* (2013.01)
*G10L 13/00* (2006.01)

(52) U.S. Cl.
CPC .............. *G10L 15/22* (2013.01); *G10L 13/00* (2013.01); *G10L 15/1815* (2013.01); *G10L 2015/223* (2013.01)

(58) Field of Classification Search
USPC ..................................................... 704/1–504
See application file for complete search history.

(56) References Cited

U.S. PATENT DOCUMENTS 7,716,057 B2 * 5/2010 Horvitz ..................... G06F 3/16 704/275
9,375,845 B1 * 6/2016 Annan ................ B25J 11/0005
(Continued)

FOREIGN PATENT DOCUMENTS

JP 2007-17990 A 1/2007

OTHER PUBLICATIONS

International Search Report dated Mar. 13, 2018 in PCT/JP2018/002509 filed on Jan. 26, 2018.
(Continued)

*Primary Examiner* — Marcus T Riley
(74) *Attorney, Agent, or Firm* — Oblon, McClelland, Maier & Neustadt, L.L.P.

(57) ABSTRACT

It is an object of the present invention to induce a dialogue to a topic that a dialogue system tries to present. A dialogue system 100 presents a first utterance which is a certain utterance and a target utterance related to the first utterance to a user 101. A humanoid robot 50-1 presents the first utterance. A microphone 11-1 receives a user utterance of the user 101 after the first utterance. A humanoid robot 50-2 presents at least one topic-inducing utterance for inducing
(Continued)

the topic to the target utterance based on a recognition result of the user utterance and an utterance sentence of the target utterance after the user utterance. The humanoid robot 50-1 presents the target utterance after the topic-inducing utterance.

16 Claims, 4 Drawing Sheets

(56) References Cited

U.S. PATENT DOCUMENTS 9,634,855 B2* 4/2017 Poltorak ............ G06K 9/00302
10,052,769 B2* 8/2018 Houssin ............... B25J 11/0005
10,726,831 B2* 7/2020 Di Fabbrizio ...... G10L 15/1815
2002/0049805 A1* 4/2002 Yamada .................. G06F 3/167 709/202
2007/0239459 A1* 10/2007 Horvitz ..................... G06F 3/16 704/275
2011/0283190 A1* 11/2011 Poltorak ............. H04L 12/2818 715/716
2015/0019228 A1* 1/2015 Akolkar .............. G06F 16/3344 704/270.1
2015/0100157 A1* 4/2015 Houssin .................. G10L 15/19 700/246
2015/0340033 A1* 11/2015 Di Fabbrizio .......... G10L 15/22 704/254
2019/0304451 A1* 10/2019 Sugiyama ................. G06F 3/16
2020/0013404 A1* 1/2020 Sugiyama ............... G10L 15/22

OTHER PUBLICATIONS

Kawahara, T., “Toward Dialogue System with Conversational Utterance,” Information Processing, vol. 45, No. 10, Oct. 2004, pp. 1027-1031 (with English translation).

Arimoto, T. et al., “Impression Evaluation of Dialogue without Voice Recognition by Plural Robots,” Conference of the Robotics Society of Japan, 2016 (with partial English translation).

Sugiyama, H. et al., “Leveraging Dependency Relations and Sentence Examples in Web-scale Corpus for Open-domain Utterance Generation,” Transactions of the Japanese Society for Artificial Intelligence, vol. 30, No. 1, 2015, pp. 183-194 (with English Abstract and partial English translation).

Meguro, T. et al., “Building a conversational system based on the fusion of rule-based and stochastic utterance generation,” Proceedings of the 28th Annual Conference of the Japanese Society for Artificial Intelligence, vol. 28, 2014, pp. 1-4 (with English Abstract and partial English translation).

* cited by examiner

DIALOGUE METHOD, DIALOGUE SYSTEM, DIALOGUE APPARATUS AND PROGRAM

TECHNICAL FIELD

The present invention relates to a technique applicable to robots or the like communicating with humans allowing a computer to have a dialogue with humans using a natural language or the like.

BACKGROUND ART

In recent years, research and development on robots communicating with humans has been progressing and put to practical use at various scenes. For example, at the site of communication therapy, there is a usage pattern in which a robot serves as a companion to talk with a person feeling loneliness. More specifically, a robot plays a role of a listener to a resident at elder care facilities, and can thereby heal the loneliness of the resident, show the resident having dialogue with the robot, and have chances to start dialogue between the resident and people around the resident such as his/her family and nurses. In addition, at the site of communication training, for example, there is a usage pattern in which a robot becomes a training partner. More specifically, the robot becomes a training partner for foreign language learners at foreign language learning facilities, thus helping the foreign language learners to efficiently proceed with foreign language learning. Furthermore, in an application as an information presentation system, robots have a dialogue with each other and have their dialogue heard by people as a basis, sometimes talk to people, cause the people to join in dialogue without making the people bored, and can thereby present information in a form easily acceptable to the people. More specifically, when people feel bored at meeting places, a bus stop, a platform at a station or the like in a town or when people can afford to participate in a dialogue at home, a classroom or the like, it is possible to expect efficient presentation of information such as news, merchandise introduction, introduction of a store of information or knowledge, education (for example, nursery and education of children, education in the liberal arts for adult people, moral enlightenment). Furthermore, in an application as an information collection system, there is a usage pattern in which a robot collects information while talking to people. Since it is possible to maintain a feeling of dialogue through communication with the robot, the system can gather information without giving people any feeling of oppression that they are being listened to by a third party. More specifically, the system is expected to be applicable to a personal information survey, a market survey, a merchandise evaluation, a taste investigation for recommended commodity or the like. Thus, a variety of applications are expected from communication between humans and robots, and an implementation of a robot that interacts with users more naturally is expected. With the wide spread of smartphones, chat services such as LINE (registered trademark) are also realized whereby a plurality of users chat with each other substantially in real time, enjoying dialogue among the users. By applying a technique of dialogue between users and robots to this chat service, it is possible to implement a chat service whereby robots can have dialogue with users more naturally even in the absence of any user as a chatting partner.

In the present specification, hardware which becomes a dialogue partner of a user such as robots used in these services or chatting partner or computer software for causing a computer to function as hardware to become the user's dialogue partner are generically called an "agent." Since the agent is intended to become the user's dialogue partner, the agent may be personified such as a robot or chatting partner, personalized or may possess characters or individuality.

The key to the implementation of these services is a technique that enables the agent implemented by hardware or computer software to have a dialogue with humans naturally.

An example of the above-described agent is a voice dialogue system described in Non-Patent Literature 1 that voice-recognizes a user utterance, understands/infers intention of the utterance and gives an appropriate response. Research on voice dialogue systems has been actively carried out with the development of voice recognition technology and has been put to practical use in automatic voice response systems, for example.

Another example of the above-described agent is a scenario dialogue system that has a dialogue with a user about a specific topic in accordance with a predetermined scenario. The scenario dialogue system allows the user to continue a dialogue as long as the dialogue develops in accordance with the scenario. For example, a dialogue system described in Non-Patent Literature 2 is a system that develops a dialogue between a user and a plurality of agents while including interruptions by the agents or exchanges between the agents. For example, an agent utters a question prepared in a scenario to the user and when the utterance of an answer from the user to the question corresponds to an option prepared in the scenario, the agent functions to make an utterance corresponding to the option. That is, the scenario dialogue system is a dialogue system in which the agent makes an utterance based on a scenario stored in advance in the system. In this dialogue system, the agent asks a question to the user, and when the agent receives an answer from the user, the agent may fend off the question by nodding "I see" regardless of contents of the user utterance or the agent may interrupt the dialogue by changing the topic, and can thereby respond in such a way that even when the user utterance is deviated from the original topic, the user will not feel a breakup of the story.

A further example of the above-described agent is a chat-oriented dialogue system in which the agent makes an utterance along with utterance contents of the user so that the user and the agent develop a natural dialogue. For example, a dialogue system described in Non-Patent Literature 3 is a system for implementing a chat-oriented dialogue between the user and the system in which while focusing on matters peculiar to the context in a plurality of dialogues made between the user and agent, the system makes an utterance according to a prescribed rule using a word included in the utterance of the user or agent as a trigger. The rule used by the chat-oriented dialogue system is not only the prescribed one but may also be one automatically generated based on contents of the user utterance or may be one automatically generated based on an immediately preceding utterance made by the user or agent or an utterance made in the vicinity thereof or may be one automatically generated based on an utterance at least including an immediately preceding utterance made by the user or agent or an utterance made in the vicinity thereof. Non-Patent Literature 3 describes a technique of automatically generating a rule based on words in a co-occurrence relation or in a dependency relation with words included in a user utterance. A dialogue system described, for example, in Non-Patent Literature 4 is a system in which a manually described rule is merged with a rule described using a statistical utterance generation technique to thereby reduce the rule generation cost. Unlike the scenario dialogue system, the chat-oriented dialogue system is not such a system in which the agent makes an utterance in accordance with a prepared scenario, and so there will be no such situation that the agent's utterance does not correspond to the user utterance and the agent can make an utterance based on at least contents of the user utterance or an immediately preceding utterance made by the user or agent or an utterance made in the vicinity thereof. That is, the chat-oriented dialogue system is a dialogue system in which the agent makes an utterance based on at least contents of the user utterance or an immediately preceding utterance made by the user or agent or an utterance made in the vicinity thereof. These chat-oriented dialogue systems can explicitly respond to the user utterances.

PRIOR ART LITERATURE

Non-Patent Literature

Non-Patent Literature 1: Tatsuya Kawahara, "Voice Dialog System Using Spoken Language," Information Processing, vol. 45, no. 10, pp. 1027-1031, October 2004

Non-Patent Literature 2: Tsunehiro Arimoto, Yuichiro Yoshikawa, Hiroshi Ishiguro, "Impression Evaluation of Dialog without Voice Recognition by Plural Robots," Conference of the Robotics Society of Japan, 2016

Non-Patent Literature 3: Hiroaki Sugiyama, Toyomi Meguro, Ryuichiro Higashinaka, Yasuhiro Minami, "Leveraging Dependency Relations and Sentence Examples in Web-scale Corpus for Open-domain Utterance Generation," Transactions of the Japanese Society for Artificial Intelligence, vol. 30 (1), pp. 183-194, 2015

Non-Patent Literature 4: Toyomi Meguro, Hiroaki Sugiyama, Ryuichiro Higashinaka, Yasuhiro Minami, "Building a conversational system based on the fusion of rule-based and stochastic utterance generation," Transactions of the Japanese Society for Artificial Intelligence, vol. 28, pp. 1-4, 2014

SUMMARY OF THE INVENTION

Problems to be Solved by the Invention

When voice recognition of a user utterance fails, a dialogue system may respond unnaturally, causing a breakup of a dialogue. There may be a method to predetermine utterances and words which can be reliably voice-recognized, but subsequent dialogues are likely to be unnatural, giving an impression that the user utterance seems to be unheard or ignored.

Furthermore, the user may often interrupt an utterance being made by the agent by making an utterance. Such an utterance is called an "interrupt." When the user interrupts, if the agent's utterance is suddenly stopped, an uncomfortable feeling is generated. Furthermore, if the interrupt is a question to the agent, the agent may not be able to answer the question.

Furthermore, there may be utterances which are not interrupts but normal user utterances to which it is hard to respond. Especially when it is desirable to change a topic, such a change is preferably made by reflecting contents of the user utterance, but the dialogue system cannot always decide a response that matches the contents of the user utterance.

In view of the above-described points, it is an object of the present invention to implement a dialogue system and a dialogue apparatus capable of inducing a dialogue to a topic that the dialogue system tries to present and allowing the dialogue to last for a long time.

Means to Solve the Problems

In order to solve the above-described problems, a dialogue method according to a first aspect of the present invention is a dialogue method executed by a dialogue system that presents a first utterance which is a certain utterance and a target utterance related to the first utterance to a user, the method comprising: a first presentation step in which a presentation part presents the first utterance; an utterance receiving step in which an input part receives a user utterance of the user after the first utterance; a second presentation step in which the presentation part presents at least one topic-inducing utterance after the user utterance to induce a topic to a target utterance based on a recognition result of the user utterance and an utterance sentence of the target utterance; and a third presentation step in which the presentation part presents the target utterance after the topic-inducing utterance.

A dialogue method according to a second aspect of the present invention is a dialogue method executed by a dialogue system that presents a target utterance related to a user utterance of a user to the user, the method comprising: an utterance receiving step in which an input part receives the user utterance; a first presentation step in which the presentation part presents at least one topic-inducing utterance to thereby induce a topic to the target utterance based on a recognition result of the user utterance after the user utterance; and a second presentation step in which the presentation part presents the target utterance after the topic-inducing utterance.

Effects of the Invention

According to the present invention, the dialogue system presents an utterance to be induced to a topic that the dialogue system tries to present based on a user action recognition result including at least a voice recognition result of the user utterance for an utterance from the dialogue system, and it is thereby possible to induce the dialogue to the topic in a natural flow. It is thereby possible to implement a dialogue system and a dialogue apparatus allowing the dialogue to last for a long time.

DETAILED DESCRIPTION OF THE EMBODIMENTS

Figure 1:
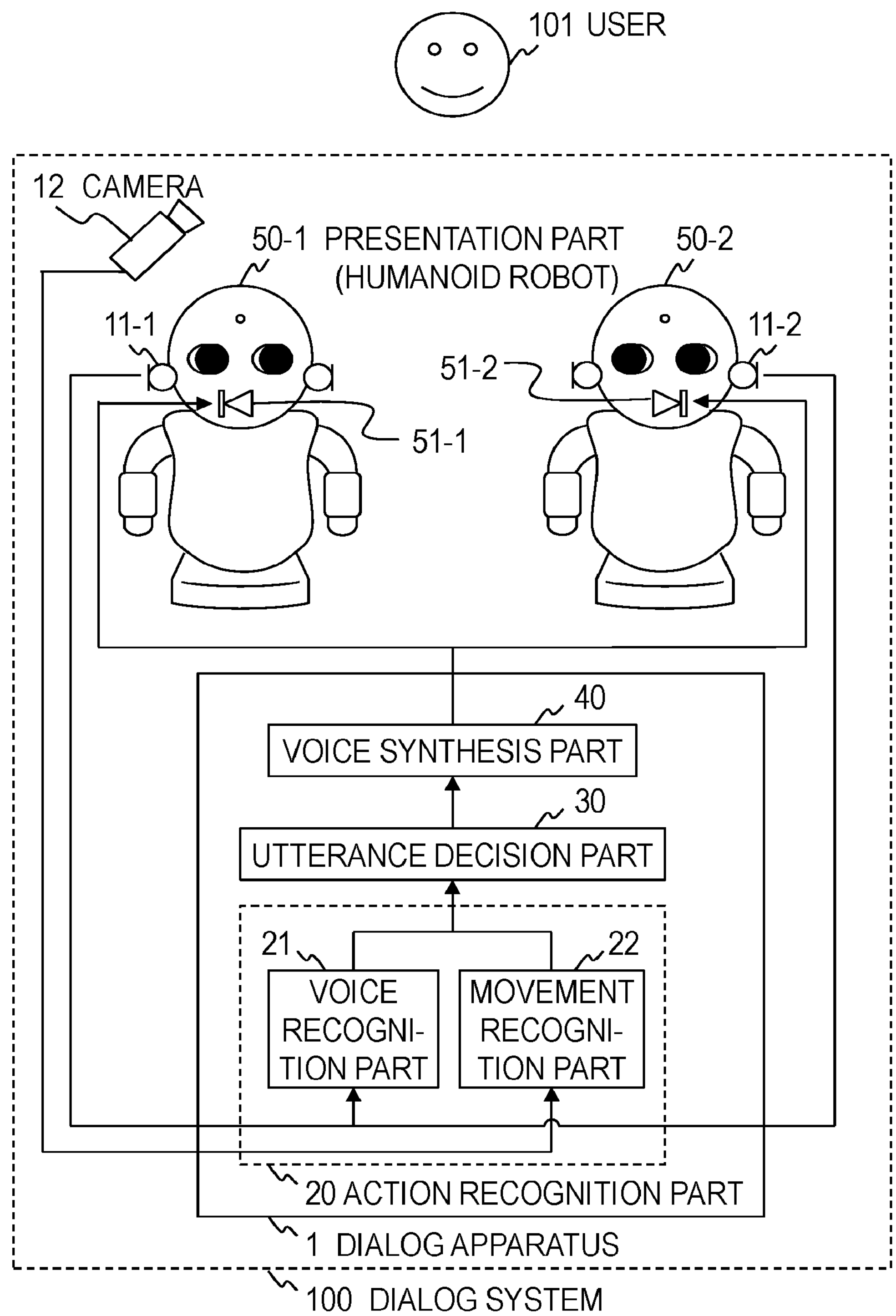
FIG. 1 is a diagram illustrating a functional configuration of a dialogue system of a first embodiment.

According to the present invention, the dialogue system presents a first utterance to ask a question to the user and presents a topic-inducing utterance to thereby induce the topic to an utterance the dialogue system tries to present in relation to the first utterance in accordance with the user utterance made in response to the first utterance. When contents of the user utterance obtained through voice recognition fall within a range expected from the question, the dialogue system decides the topic-inducing utterance based on the user utterance and the target utterance and presents the topic-inducing utterance before the target utterance. When the dialogue system fails in the action recognition of the user utterance, the dialogue system decides the topic-inducing utterance based on the first utterance and the target utterance and presents the topic-inducing utterance before the target utterance. In a case where the dialogue system is successful in recognizing whether the contents are positive or negative, but is not successful in obtaining other information through voice recognition, the dialogue system presents an utterance following the user utterance, then decides the topic-inducing utterance based on the first utterance and the target utterance, and presents the topic-inducing utterance before the target utterance.

When the contents of the user utterance obtained through the voice recognition are outside the range expected from the question, the user utterance can be determined as an interrupt. In this case, the dialogue system decides the topic-inducing utterance based on the user utterance and the target utterance, and presents the topic-inducing utterance before the target utterance. In this case, the contents of the target utterance decided in advance can be changed in accordance with the contents of the user utterance.

The present invention is applicable even when the user utterance is not intended to answer the question from the dialogue system, but is made independently of the immediately preceding dialogue. For example, when no similar contents of the user utterance are found among scenarios stored in advance in the dialogue system, the topic-inducing utterance may be decided based on the user utterance and the target utterance by assuming the utterance included in the selected scenario as the target utterance and presented before the target utterance.

Hereinafter, embodiments of the present invention will be described in detail. Note that components having the same functions in the accompanying drawings are assigned the same reference numerals and overlapping description will be omitted.

First Embodiment

A dialogue system according to a first embodiment is a system in which a plurality of humanoid robots cooperate with one another to have a dialogue with a user. That is, the dialogue system of the first embodiment is an example when the agent is a humanoid robot. As shown in FIG. 1, the dialogue system 100 includes, for example, a dialogue apparatus 1, an input part 10 provided with at least a microphone 11 and a presentation part 50 provided with at least a speaker 51. The input part 10 may be provided with a camera 12 in addition to the microphone 11. The dialogue apparatus 1 is provided with, for example, an action recognition part 20, an utterance decision part 30 and a voice synthesis part 40. The action recognition part 20 may be provided with at least a voice recognition part 21 and a movement recognition part 22. The dialogue system 100 performs processes in respective steps, which will be described later, and thereby implements the dialogue method of the first embodiment.

The dialogue apparatus 1 is a special apparatus configured by causing a well-known or dedicated computer provided with, for example, a central processing unit (CPU) and a main storage apparatus (RAM: Random Access Memory) to read a special program. The dialogue apparatus 1, for example, executes each process under the control of the central processing unit. Data inputted to the dialogue apparatus 1 and data obtained through each process are stored, for example, in the main storage apparatus, and the data stored in the main storage apparatus is read as required and used for other processes. Furthermore, at least part of each processing part of the dialogue apparatus 1 may be constructed of hardware such as an integrated circuit.

[Input Part 10]

The input part 10 may be configured to be integral with or partially integral with the presentation part 50. In the example in FIG. 1, microphones 11-1 and 11-2 which are parts of the input part 10 are mounted on the heads (positions of the ears) of humanoid robots 50-1 and 50-2 which are the presentation parts 50. In the example in FIG. 1, the camera 12 which is a part of the input part 10 is provided independently, but, for example, the camera 12 may be mounted on the heads (positions of the eyes) of the humanoid robots 50-1 and 50-2. In the example in FIG. 1, the presentation part 50 is constructed of the two humanoid robots 50-1 and 50-2, but the number of humanoid robots can be plural and the presentation part 50 may be constructed of three or more humanoid robots.

The input part 10 is an interface for the dialogue system 100 to acquire user utterances. In other words, the input part 10 is an interface to input utterance voice or a physical movement of the user utterance to the dialogue system 100. For example, the input part 10 is the microphone 11 that collects user utterance voice and converts the user utterance voice to a voice signal. The microphone 11 may be enabled to collect utterance voice uttered by a user 101. That is, FIG. 1 is an example and either one of the microphone 11-1 or 11-2 may not be provided. Furthermore, one or more microphones provided in places different from the humanoid robots 50-1 and 50-2 in the vicinity of the user 101 or a microphone array provided with a plurality of microphones are used as the input part so as to adopt a configuration not provided with both the microphones 11-1 and 11-2. The microphone 11 outputs a voice signal of the utterance voice of the user obtained through the conversion. The voice signal outputted from the microphone 11 is inputted to the voice recognition part 21 of the action recognition part 20. For example, in addition to the microphone 11, the input part 10 may also be provided with the camera 12 that records physical movements of the user and converts the physical movements to video signals. The camera 12 may be enabled to record physical movements of the user 101. That is, FIG. 1 is an example, and the camera 12 may be one camera or a plurality of cameras. The camera 12 outputs the video signals of the physical movements of the user obtained through the conversion. The video signals outputted from the camera 12 are inputted to the movement recognition part 22 of the action recognition part 20.

[Action Recognition Part 20]

The action recognition part 20 receives at least a voice signal of the utterance voice of the user collected by the microphone 11 as input, uses at least the voice recognition part 21, obtains the user action recognition result including at least the voice recognition result obtained by the voice recognition part 21 and outputs the voice recognition result to the utterance decision part 30. Note that the action recognition part 20 may also receive video signals of physical movements of the user recorded by the camera 12 as input, obtain the user action recognition result also including the movement recognition result of the user utterance obtained by the movement recognition part 22 using also the movement recognition part 22 and output the movement recognition result to the utterance decision part 30.

[Voice Recognition Part 21]

The voice recognition part 21 voice-recognizes the voice signal of the utterance voice of the user inputted from the microphone 11, obtains and outputs the voice recognition result of the user utterance. The voice recognition result of the user utterance outputted from the voice recognition part 21 is included in the user action recognition result and outputted by the action recognition part 20. Details of the voice recognition method and the voice recognition result will be described later.

[Movement Recognition Part 22]

The movement recognition part 22 obtains the user movement recognition result from the video signal of the user's physical movement inputted from the camera 12 and outputs the user movement recognition result. The movement recognition result of the user utterance outputted from the movement recognition part 22 is included in the user action recognition result and outputted by the action recognition part 20. Details of the movement recognition method and the movement recognition result will be described later.

[Utterance Decision Part 30]

The utterance decision part 30 decides text representing the utterance contents from the dialogue system 100 and outputs the text to the voice synthesis part 40. When the user action recognition result is inputted from the action recognition part 20, the utterance decision part 30 decides the text representing the utterance contents from the dialogue system 100 based on at least the voice recognition result of the user utterance included in the inputted user action recognition result and outputs the text to the voice synthesis part 40. Note that when the presentation part 50 of the dialogue system 100 is constructed of a plurality of humanoid robots, the utterance decision part 30 may decide which humanoid robot presents the utterance. In this case, the utterance decision part 30 also outputs information indicating the humanoid robot that presents the utterance together to the voice synthesis part 40. In this case, the utterance decision part 30 may decide the partner to whom the utterance is presented, that is, whether the utterance is presented to the user or to any one humanoid robot. In this case, the utterance decision part 30 outputs the information indicating the partner to whom the utterance is presented together to the voice synthesis part 40.

[Voice Synthesis Part 40]

The voice synthesis part 40 converts text representing the utterance contents inputted from the utterance decision part 30 to a voice signal representing the utterance contents and outputs the voice signal to the presentation part 50. The method for voice synthesis carried out by the voice synthesis part 40 can be any existing voice synthesis technique and a most suitable one may be selected as appropriate in accordance with the usage environment or the like. Note that when information indicating the humanoid robot that presents the utterance is inputted from the utterance decision part 30 together with the text representing the utterance contents, the voice synthesis part 40 outputs a voice signal representing the utterance contents to the humanoid robot corresponding to the information. Furthermore, when information indicating a partner to whom the utterance is presented is also inputted together with the text representing the utterance contents and information indicating the humanoid robot that presents the utterance from the utterance decision part 30, the voice synthesis part 40 outputs the voice signal representing the utterance contents and the information indicating the partner to whom the utterance is presented to the humanoid robot corresponding to the information.

[Presentation Part 50]

The presentation part 50 is an interface for the utterance decision part 30 to present the decided utterance contents to the user. For example, the presentation part 50 is a humanoid robot manufactured by imitating the human form. This humanoid robot pronounces the voice corresponding to a voice signal representing the utterance contents inputted from the voice synthesis part 40 from the speaker 51 mounted on, for example, the head. That is, the humanoid robot presents the utterance. The speaker 51 may be enabled to pronounce the voice corresponding to the voice signal representing the utterance contents inputted from the voice synthesis part 40. That is, FIG. 1 is an example and either one of the speaker 51-1 or 51-2 may not be provided. A configuration may also be adopted in which one or more speakers or a speaker array provided with a plurality of speakers are provided in places different from the humanoid robots 50-1 and 50-2 in the vicinity of the user 101 or the like, but both the speakers 51-1 and 51-2 are not provided. Furthermore, the humanoid robot may present the utterance contents decided by the utterance decision part 30 through nonverbal action such as facial expressions and physical movement to the user. For example, nonverbal action may be presented such as nodding the head vertically to present an agreement on an immediately preceding utterance or shaking the head horizontally to present a disagreement. When presenting an utterance, the humanoid robot directs its face or whole body toward the user or the other humanoid robot, and can thereby express that it presents the utterance to the user or the other humanoid robot located in the direction the face or body is directed. When the presentation part 50 is a humanoid robot, one humanoid robot is provided for each personality (agent) joining the dialogue. Hereinafter, it is assumed that there are two humanoid robots 50-1 and 50-2 as an example where two personalities join the dialogue. Note that when the utterance decision part 30 has already decided from which humanoid robot the utterance is presented, the humanoid robot 50-1 or 50-2 which receives a voice signal representing the utterance contents outputted from the voice synthesis part 40 presents the utterance. When the information indicating the partner to whom the utterance decided by the utterance decision part 30 is presented is inputted, the humanoid robot 50-1 or 50-2 presents the utterance while directing its face or eyes in the direction of the humanoid robot or user corresponding to the information indicating the partner to whom the utterance is presented.

Figure 2:
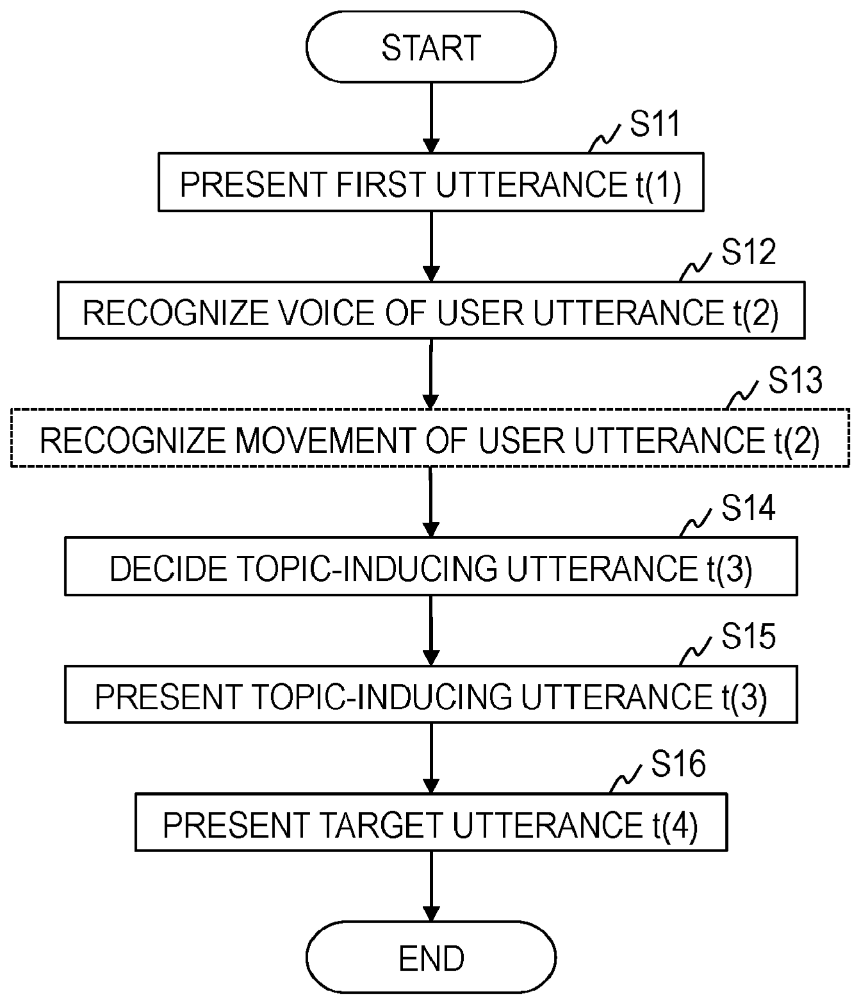
FIG. 2 is a diagram illustrating a processing procedure of a dialogue method of the first embodiment.

Hereinafter, a processing procedure of the dialogue method of the first embodiment will be described with reference to FIG. 2.

In step S11, the dialogue system 100 outputs the voice representing contents of a first utterance from the speaker 51-1 provided for the humanoid robot 50-1, that is, the dialogue system 100 presents the first utterance. The voice representing the contents of the first utterance is the text representing the contents of the first utterance decided by the utterance decision part 30 converted to a voice signal by the voice synthesis part 40. The utterance decision part 30 may arbitrarily select text representing the contents of the first utterance, for example, from among predetermined fixed phrases stored in a storage part (not shown) in the utterance decision part 30 or decided in accordance with the utterance contents up to the immediately preceding one. As for the technique of deciding the utterance contents in accordance with the utterance contents up to the immediately preceding one, one used in conventional dialogue systems may be used, and, for example, the scenario dialogue system described in Non-Patent Literature 2 or the chat-oriented dialogue system described in Non-Patent Literature 3 or 4 may be used. When the utterance decision part 30 uses the technique used in the scenario dialogue system, for example, the utterance decision part 30 selects, for a dialogue including five immediately preceding utterances, scenarios in which an inter-word distance between words included in each utterance and focus words constituting each utterance, and words and focus words included in each scenario stored in the storage part (not shown) in the utterance decision part 30 is shorter than a predetermined distance, selects text included in the selected scenario and thereby decides text representing contents of the first utterance. When the utterance decision part 30 uses a technique used in the chat-oriented dialogue system, the utterance decision part 30 may decide, for example, text representing contents of the first utterance according to a prescribed rule stored in the storage part (not shown) in the utterance decision part 30 using words included in the user utterance as a trigger, or automatically generate a rule based on words in a co-occurrence relation or dependency relation with words included the user utterance and decide the text representing the contents of the first utterance according to the rule.

The utterance decision part 30 decides text representing the contents of the first utterance and text representing the contents of a target utterance. The contents of the target utterance are related to the contents of the first utterance and an utterance relating to a topic about which the dialogue system desires to have a dialogue. The utterance decision part 30 may further decide an utterance following the target utterance. When the utterance decision part 30 selects a scenario stored in advance by the scenario dialogue system, the first utterance and the target utterance are utterances prepared in advance as utterances included in one scenario. When the utterance decision part 30 decides an utterance through the chat-oriented dialogue system, the utterance decision part 30 inputs the text representing the contents of the first utterance to the chat-oriented dialogue system and decides the target utterance. Furthermore, by recursively inputting the decided target utterance to the chat-oriented dialogue system, it is possible to also decide the utterance following the target utterance.

In step S12, the microphone 11 receives an utterance made by the user 101. Hereinafter, this utterance is referred to as a "user utterance." The voice signal representing contents of the user utterance acquired by the microphone 11 is inputted to the voice recognition part 21. The voice recognition part 21 voice-recognizes the voice signal representing the contents of the user utterance acquired by the microphone 11.

As the method of voice recognition carried out by the voice recognition part 21, for example, A. x-choice recognition, B. positive/negative recognition or C. validity recognition is used as appropriate depending on the contents of the first utterance.

A. x-choice recognition refers to a voice recognition technique that reduces misrecognition by limiting recognition to a range of words expected in advance from a dialogue flow. The expected range may be expected words themselves, words whose word categories match such as shop name or the presence or absence of a negative form. For example, since there are x (x is a natural number) words in a range expected in advance, this method is called "x-choice recognition" in the present specification. That is, the voice recognition is a two-choice voice recognition when there are two words in an expected range, or a three-choice voice recognition when there are three words in an expected range. When the voice recognition part 21 performs x-choice recognition, text representing the contents of the first utterance decided by the utterance decision part 30 is also inputted in addition to the voice signal representing the contents of the user utterance acquired by the microphone 11 to the voice recognition part 21 in order to obtain x words within the expected range in the voice recognition part 21. When performing x-choice recognition, the voice recognition part 21 recognizes to which word among x words in the expected range a voice signal representing contents of the user utterance corresponds. The voice recognition part 21 outputs information indicating the word to which the voice signal representing the contents of the user utterance corresponds when the recognition has been successful or information indicating a recognition failure when the recognition has been unsuccessful by including the information in the voice recognition result of the user utterance as the x-choice recognition result.

The voice recognition part 21 may first voice-recognize the voice signal representing the contents of the user utterance acquired by the microphone 11, obtain text of the recognition result, then check to see whether or not the text obtained as the recognition result corresponds to any word within a range expected from the text representing the contents of the first utterance, and assume, as the x-choice recognition result, the information indicating the word to which the voice signal representing the contents of the user utterance corresponds when the text obtained as the recognition result corresponds to any word within the range expected from the text representing the contents of the first utterance or the information indicating a recognition failure when the text obtained as the recognition result does not correspond to any word within the range expected from the text representing the contents of the first utterance.

As described above, when the voice recognition part 21 performs A. x-choice recognition, the voice signal representing the contents of the user utterance acquired by the microphone 11 and the text representing the contents of the first utterance determined by the utterance decision part 30 are at least inputted to the voice recognition part 21, and the voice recognition part 21 outputs information indicating the word to which the voice signal representing the contents of the user utterance corresponds or information indicating a recognition failure by including the information in the voice recognition result of the user utterance as the x-choice recognition result.

Note that x-choice recognition may be performed not about words but about categories. In this case, for example, the voice signal representing the contents of the user utterance acquired by the microphone 11 and the text representing the contents of the first utterance determined by the utterance decision part 30 are at least inputted to the voice recognition part 21, and the voice recognition part 21 outputs the information indicating the category to which the voice signal representing the contents of the user utterance corresponds or information indicating a recognition failure by including the information in the voice recognition result of the user utterance as the x-choice recognition result. In this case, the dialogue system 100 uses categories instead of words in subsequent processes.

When words and categories of the x-choice recognition are predetermined not based on the text representing the contents of the first utterance, no text representing the contents of the first utterance may be inputted to the voice recognition part 21, but x-choice recognition may be performed, for example, using the words stored in a predetermined storage part (not shown). Furthermore, for example, x-choice recognition may be performed by selecting some of the words stored in the predetermined storage part (not shown) based on a dialogue by a user before the first utterance and the dialogue system 100 and using the selected word.

"B. positive/negative recognition" is a technique used when it is sufficient to only recognize, from a dialogue flow, whether the user utterance has positive contents or negative contents. For example, after the dialogue system presents a question that can be answered with Yes/No, even when part of an utterance is misrecognized, if the utterance ends in a negative form, it is likely that the user has made an utterance with the intention to mean No as a whole. When the voice recognition part 21 performs "B. positive/negative recognition," the voice signal representing the contents of the user utterance acquired by the microphone 11 and the text representing the contents of the first utterance determined by the utterance decision part 30 are inputted to the voice recognition part 21, for example, and the voice recognition part 21 recognizes whether the voice signal representing the contents of the user utterance has positive contents or negative contents with respect to the first utterance. The voice recognition part 21 outputs information indicating that the voice signal representing the contents of the user utterance has positive contents with respect to the first utterance or information indicating that the voice signal representing the contents of the user utterance has negative contents with respect to the first utterance when the recognition is successful, and information indicating a recognition failure when the recognition is unsuccessful, by including the information in the voice recognition result of the user utterance as the positive/negative recognition result.

"C. validity recognition" is a technique that voice-recognizes the voice signal representing the contents of the user utterance acquired by the microphone 11 and determines whether or not the text obtained as the recognition result is valid text as the utterance in syntactical or semantical terms. When the voice recognition part 21 performs "C. validity recognition," the voice signal representing the contents of the user utterance acquired by the microphone 11 is at least inputted to the voice recognition part 21 and the voice recognition part 21 voice-recognizes the voice signal representing the contents of the user utterance, obtains text of the recognition result and determines whether or not the text obtained is valid text as the utterance in syntactical or semantical terms. The voice recognition part 21 outputs information indicating a valid utterance and the text of the recognition result when the text obtained is valid text as the utterance in syntactical or semantical terms or information indicating an invalid utterance when the text obtained is not valid text as the utterance in syntactical or semantical terms by including the information in the voice recognition result of the user utterance as the validity recognition result.

In step S13, the camera 12 may receive a physical movement of the user 101. In this case, a video signal of the user's physical movement acquired by the camera 12 is inputted to the movement recognition part 22. The movement recognition part 22 obtains the movement recognition result of the user utterance based on the video signal of the user's physical movement acquired by the camera 12 and outputs the movement recognition result. When the movement recognition part 22 recognizes the user's intention with Yes/No, the movement recognition part 22 recognizes the intention with Yes/No, that is, whether the movement of the user utterance has positive contents or negative contents with respect to the first utterance from the user's expressions or movement of nodding or shaking the head vertically or horizontally included in the video signal of the user physical movement acquired by the camera 12. The movement recognition part 22 outputs information indicating that the user's utterance movement has positive contents with respect to the first utterance or information indicating that the user's utterance movement has negative contents when the recognition is successful or information indicating a recognition failure when the recognition is unsuccessful by including the information in the user utterance movement recognition result as the positive/negative recognition result.

The movement recognition method carried out by the movement recognition part 22 is a method using a variation in the user's expressions and movement of the user's head or the like. In this method, the movement recognition part 22 acquires time-sequential images of the user's face from the inputted video signal and acquires the user's movement contents which are variations of features (e.g., size of the pupil, position of the tail of the eye, positions of the eyes, position of angle of mouth, degree of opening of mouth) from the acquired time-sequential images. When the user's movement contents acquired include predetermined movements stored in the storage part (not shown) in the movement recognition part 22, the movement recognition part 22 recognizes that the user's utterance movement has positive contents or negative contents with respect to the first utterance. For example, when the user makes an utterance while nodding, this may be interpreted as having the intention to mean positive (Yes), whereas when the user makes an utterance while inclining or shaking his/her head, this may be interpreted as having the intention to mean negative (No), and so these movements are stored in the storage part (not shown) in the movement recognition part 22 as predetermined movements.

In step S14, the utterance decision part 30 receives the user's action recognition result outputted from the action recognition part 20, that is, receives at least the voice recognition result of the user utterance outputted from the voice recognition part 21 and decides text expressing contents of the topic-inducing utterance for inducing the topic to the target utterance at least based on the voice recognition result of the user utterance and the text representing the contents of the target utterance. The topic-inducing utterance may be one utterance or a plurality of utterances. The utterance decision part 30 may decide a humanoid robot that presents a topic-inducing utterance, and in such a case, the utterance decision part 30 outputs information indicating the humanoid robot that presents the topic-inducing utterance together with the text expressing contents of the topic-inducing utterance. The utterance decision part 30 may also decide a partner to whom the topic-inducing utterance is presented, and in such a case, the utterance decision part 30 outputs information indicating the partner to whom the topic-inducing utterance is presented together with text expressing contents of the topic-inducing utterance.

The utterance decision part 30 decides a topic-inducing utterance in accordance with the following classification at least based on the voice recognition result of the user utterance. More specifically, the classification includes 1. when contents of a user utterance obtained through voice recognition fall within an expected range (hereinafter referred to as "1. utterance within expectations"), 2. when action recognition fails (hereinafter referred to as "2. action recognition failure"), 3. when it is possible to recognize whether an utterance is positive or negative through action recognition, but no other information is obtained through voice recognition (hereinafter referred to as "3. partial recognition success"), and 4. when contents of the user utterance obtained through voice recognition are outside the expected range, that is, when the user makes an arbitrary utterance ignoring contents of the first utterance or intention (hereinafter referred to as "4. unexpected utterance")

Depending on the user's action recognition result inputted from the action recognition part 20, the utterance decision part 30 decides which of "1. utterance within expectations," "2. action recognition failure," "3. partial recognition success" or "4. unexpected utterance" corresponds to the classification based on contents of the first utterance, the technique of voice recognition carried out by the voice recognition part 21 in the action recognition part 20 and the technique of the movement recognition carried out by the movement recognition part 22 in the action recognition part 20. Five examples will be described hereinafter.

[Case 1: when first utterance is question to be answered with one among x choices and Yes/No]

In this case, the action recognition part 20 performs x-choice recognition, positive/negative recognition and validity recognition, and the recognition results are inputted to the utterance decision part 30 as the user action recognition results.

When the result of the x-choice recognition included in the inputted user action recognition result is information indicating a word, the utterance decision part 30 determines "1. utterance within expectations."

When the result of the x-choice recognition included in the inputted user action recognition result is information indicating a recognition failure, and when the result of the positive/negative recognition included in the inputted user action recognition result is information indicating a recognition failure and when the result of the validity recognition included in the inputted user action recognition result is information indicating an invalid utterance, the utterance decision part 30 determines "2. action recognition failure."

When the result of the x-choice recognition included in the inputted user action recognition result is information indicating a recognition failure and when the result of the positive/negative recognition included in the inputted user action recognition result is information indicating positive contents or information indicating negative contents, the utterance decision part 30 determines "3. partial recognition success."

When the result of the x-choice recognition included in the inputted user action recognition result is information indicating a recognition failure, and when the result of the positive/negative recognition included in the inputted user action recognition result is information indicating a recognition failure and when the result of the validity recognition included in the inputted user action recognition result is information indicating a valid utterance, the utterance decision part 30 determines "4. unexpected utterance."

[Case 2: when user makes utterance while presenting first utterance]

In this case, the action recognition part 20 performs validity recognition and the validity recognition result is inputted to the utterance decision part 30 as the user action recognition result.

When the validity recognition result included in the inputted user action recognition result is information indicating a valid utterance, the utterance decision part 30 determines "4. unexpected utterance."

When the validity recognition result included in the inputted user action recognition result is information indicating an invalid utterance, the utterance decision part 30 determines "2. action recognition failure."

[Case 3: when first utterance is question to be answered with Yes/No]

In this case, the action recognition part 20 performs positive/negative recognition and validity recognition, and these recognition results are inputted to the utterance decision part 30 as the user action recognition results.

When the positive/negative recognition result included in the inputted user action recognition result is information indicating positive contents or information indicating negative contents, the utterance decision part 30 determines "1. utterance within expectations."

When the positive/negative recognition result included in the inputted user action recognition result is information indicating a recognition failure and when the validity recognition result included in the inputted user action recognition result is information indicating an invalid utterance, the utterance decision part 30 determines "2. action recognition failure."

When the positive/negative recognition result included in the inputted user action recognition result is information indicating a recognition failure and when the validity recognition result included in the inputted user action recognition result is information indicating a valid utterance, the utterance decision part 30 determines "4. unexpected utterance."

[Case 4: when first utterance is question asking which of x choices]

In this case, the action recognition part 20 performs x-choice recognition and validity recognition, and these recognition results are inputted to the utterance decision part 30 as the user action recognition results.

When the x-choice recognition result included in the inputted user action recognition result is information indicating a word, the utterance decision part 30 determines "1. utterance within expectations."

When the x-choice recognition result included in the inputted user action recognition result is information indicating a recognition failure and when the validity recognition result included in the inputted user action recognition result is information indicating an invalid utterance, the utterance decision part 30 determines "2. action recognition failure."

When the x-choice recognition result included in the inputted user action recognition result is information indicating a recognition failure and when the validity recognition result included in the inputted user action recognition result is information indicating a valid utterance, the utterance decision part 30 determines "4. unexpected utterance."

[Case 5: when first utterance is open question]

In this case, the action recognition part 20 performs x-choice recognition and validity recognition, and these recognition results are inputted to the utterance decision part 30 as the user action recognition results. The action recognition part 20 performs x-choice recognition.

When the x-choice recognition result included in the inputted user action recognition result is information indicating a word, the utterance decision part 30 determines "1. utterance within expectations."

When the x-choice recognition result included in the inputted user action recognition result is information indicating a recognition failure and when the validity recognition result included in the inputted user action recognition result is information indicating an invalid utterance, the utterance decision part 30 determines "2. action recognition failure."

When the x-choice recognition result included in the inputted user action recognition result is information indicating a recognition failure and when the validity recognition result included in the inputted user action recognition result is information indicating a valid utterance, the utterance decision part 30 determines "4. unexpected utterance."

When the utterance decision part 30 determines that the classification is any one of "1. utterance within expectations," "2. action recognition failure," "3. partial recognition success" and "4. unexpected utterance," the following will describe what topic-inducing utterance is to be decided. Note that the utterance decision part 30 may also decide a topic-inducing utterance as will be described later in [Specific Examples of First Embodiment].

In the case of "1. utterance within expectations," the utterance decision part 30 decides a topic-inducing utterance easily associated from any one of words included in a user utterance and suggestive of any one of focus words of a target utterance. The utterance decision part 30 first extracts a word associated from each word included in the user utterance and a word suggestive of each focus word of the target utterance as associative words respectively. Examples of the method for extracting associative words include a method whereby dependency relations and co-occurrence relations among words in a large-scale text corpus are stored in advance and words related to a certain word are outputted, a method whereby synonym/similar words are outputted using a synonym/similar word dictionary, a method whereby words having semantic vectors with similar meanings are outputted using a method of converting words of word2vec or the like to semantic vectors. According to these methods, a plurality of words may be outputted, and in such cases, it may be possible to adopt a method whereby one word is randomly selected and outputted from a set of a plurality of words or a method whereby focus words of a target utterance and associative words which are close to each other are preferentially outputted. The utterance decision part 30 selects utterance sentences according to context from among those utterance sentences stored in the storage part (not shown) of the utterance decision part 30, which include both associative words of the user utterance and associative words of the target utterance, and thereby decides a topic-inducing utterance. The topic-inducing utterance to be decided may be an utterance including a plurality of utterances and suggestive of any one of focus words of the target utterance from words included in the user utterance through association in a plurality of stages.

In the case of "2. action recognition failure," one or more utterances related to the first utterance and a topic-inducing utterance suggestive of any one focus word of the target utterance are decided. There can be a variety of possible patterns for the one or more utterances related to the first utterance. Examples of such an utterance include an utterance having contents similar to those of the first utterance to be presented from the humanoid robot 50-1 which presents the first utterance to the other humanoid robot 50-2 and, on the other hand, an utterance to be presented by the humanoid robot 50-2 whose contents are an answer expected from the contents of the first utterance. Furthermore, another example is an utterance related to the contents of the first utterance which does not directly respond to the intention of the first utterance to be presented to the humanoid robot 50-1 which has presented the first utterance by the humanoid robot 50-2 other than the humanoid robot 50-1 which has presented the first utterance. Further examples include an utterance whose contents are answers according to the intention of the first utterance to be presented to the humanoid robot 50-1 which has presented the first utterance by the humanoid robot 50-2 other than the humanoid robot 50-1 which has presented the first utterance and an utterance including additional information such as reasoning thereof.

In the case of "3. partial recognition success," when the user utterance is determined as having positive contents, an utterance indicating that it is possible to agree with the user to be presented by the humanoid robot 50-1 which has presented the first utterance and a topic-inducing utterance that associates any one of focus words of the target utterance without causing contradiction with the utterance are decided. When the user utterance is determined as having negative contents, an utterance indicating that it is not possible to agree with the user to be presented by the humanoid robot 50-1 that has presented the first utterance, an utterance indicating that it is possible to agree or it is not possible to agree to be presented to the user by the other humanoid robot 50-2 and a topic-inducing utterance that associates any one of focus words of the target utterance without causing contradiction with these utterances are decided.

In the case of "4. unexpected utterance," a plurality of utterances related to the user utterance and a topic-inducing utterance associating any one of focus words of the target utterance are decided. A plurality of humanoid robots that present respective utterances may be decided so that the plurality of humanoid robots share the presentation of a plurality of utterances related to the user utterance. When the target utterance is constructed of a plurality of utterances, if a more natural flow is achieved by connecting a topic of the user utterance to second and subsequent utterances of the target utterance, part of the target utterance may be omitted. When it is difficult to connect the topic of the user utterance to any utterance of the target utterance, the decided target utterance may be discarded and another utterance may be reselected as a new target utterance.

In step S15, the voice synthesis part 40 converts text representing contents of the topic-inducing utterance to a voice signal representing contents of the topic-inducing utterance and the presentation part 50 outputs a voice corresponding to the voice signal representing the utterance contents from the speaker 51-1 provided for the humanoid robot 50-1 or the speaker 51-2 provided for the humanoid robot 50-2. Upon receiving information indicating the humanoid robot that presents the topic-inducing utterance together with the text representing contents of the topic-inducing utterance from the utterance decision part 30 as input, the presentation part 50 outputs a voice representing contents of the topic-inducing utterance from the speaker 51 provided for the humanoid robot 50 corresponding to the information. Upon receiving information indicating the partner to whom the topic-inducing utterance together with the text representing contents of the topic-inducing utterance is presented from the utterance decision part 30 as input, the presentation part 50 outputs a voice representing contents of the topic-inducing utterance with the face or the whole body of the humanoid robot 50 being directed toward the direction of the partner corresponding to the information.

In step S16, the voice synthesis part 40 converts text representing the contents of the target utterance to a voice signal representing the contents of the target utterance, and the presentation part 50 outputs a voice corresponding to the voice signal representing contents of the target utterance from the speaker 51-1 provided for the humanoid robot 50-1 or the speaker 51-2 provided for the humanoid robot 50-2. Upon receiving information indicating the humanoid robot that presents the target utterance together with text representing the contents of the target utterance from the utterance decision part 30 as input, the presentation part 50 outputs a voice representing the contents of the target utterance from the speaker 51 provided for the humanoid robot 50. Upon receiving information indicating the partner to whom the target utterance together with text representing the contents of the target utterance is presented from the utterance decision part 30 as input, the presentation part 50 outputs a voice representing the contents of the target utterance with the face or the whole body of the humanoid robot 50 being directed toward the direction of the partner corresponding to the information.

Hereinafter, the dialogue system makes an utterance having contents of target utterances as a topic, and thereby continues a dialogue with the user. For example, when a target utterance is generated using a technique used in a scenario dialogue system, the dialogue system outputs a voice representing utterance contents of the scenario utterance decided using a technique used in the scenario dialogue system from the speaker so that a dialogue along the scenario selected using the technique used in the scenario dialogue system is performed between the user and the dialogue system. Furthermore, for example, when a target utterance is generated using a technique used in a chat-oriented dialogue system, the dialogue system outputs a voice representing utterance contents of a chat utterance decided using the technique used in the chat-oriented dialogue system based on the user utterance from the speaker. The humanoid robot that presents subsequent utterances may be one humanoid robot or a plurality of humanoid robots.

Specific Examples of First Embodiment

Hereinafter, specific examples of dialogue contents according to the first embodiment will be described. In the description in the following specific examples, "R" represents a robot and "H" represents a user. A number after "R" is an identifier of a humanoid robot. t(i) (i=0, 1, 2, . . . ) represents an utterance or action during a dialogue, and especially t(1) represents a first utterance, t(2) represents a user utterance in response to the first utterance, t(3) represents a topic-inducing utterance and t(4) represents a target utterance. The order of description of each utterance or action represents the order in which the utterance or action is presented or expressed. When each utterance is made up of a plurality of utterances, each utterance is represented by t(i-j). For example, when the topic-inducing utterance includes three utterances, the topic-inducing utterance is represented by t(3-1), t(3-2) and t(3-3).

Specific Example 1-1: Utterance Within Expectations, Induction of Topic by Association Specific example 1-1 is an example where induction of a topic is performed by association when a voice recognition result of the user utterance falls within a range expected from contents of the first utterance.

t(1) R1: Among ramen, soba and udon, are you a ramen lover after all?
t(2) H: No, I prefer soba.
t(3) R2: I suppose so. Soba sounds healthy, doesn't it?
t(4) R1: Ramen after drinking is no good in terms of health, but it's tasty, isn't that?

In this example, in order to lead "health" which is one of focus words of the target utterance t(4) the dialogue system tries to present by association, the humanoid robot R2 which is different from the humanoid robot R1 that gives the first utterance t(1) gives the topic-inducing utterance t(3) including "healthy" after the user utterance t(2) made in response to the first utterance t(1) which falls within a range expected from contents of the first utterance t(1). This causes participants who recognize that the current dialogue deems "health" as a topic to become the majority, and can thereby induce the topic. On the other hand, the dialogue system shows approval (portion of "Right") for the user answer t(2) which is a user utterance to the first utterance t(1), taking care not to cause the user to become a minority completely or feel a sense of alienation. In this case, it may be the humanoid robot R2 which gives the topic-inducing utterance t(3) or the other humanoid robot R1 that makes the utterance showing approval.

Specific Example 1-2: Utterance Within Expectations, Induction of Topic by Association, Plurality of Utterances Specific example 1-2 is an example where a topic is induced by association in a plurality of stages when the voice recognition result of the user utterance falls within a range expected from contents of the first utterance.

t(1) R1: Among ramen, soba and udon, are you a ramen lover after all?
t(2) H: Udon.
t(3-1) R2: Speaking of udon, Kagawa is renowned for that.
t(3-2) R1: Yeah, but the udon I ate in Wakayama the other day was good, too.
t(3-3) R2: Is that so? I believe Wakayama is famous for only ramen.
t(3-4) R1: It's famous for udon, too. But Wakayama is certainly famous for ramen if anything.
t(4) R1: Ramen after drinking is no good in terms of health, but ifs tasty, isn't that?

In this example, "ramen" which is one of the focus words of the target utterance t(4) the dialogue system tries to present is induced from the word "udon" included in the user utterance t(2) made in response to the first utterance t(1) that falls within the range expected from contents of the first utterance t(1) through the plurality of topic-inducing utterances t(3-1) to t(3-4) by association in a plurality of stages: "udon"→"Kagawa"→"Wakayama"→"ramen." The plurality of humanoid robots share these topic-inducing utterances t(3-1) to t(3-4), and can thereby cause the participants who recognize that the current dialogue has "ramen" as the topic to become a majority and induce the topic.

Specific Example 2-1: Action Recognition Failure, Same Utterance to Other Robot Specific example 2-1 is an example where when the dialogue system fails in user utterance action recognition, the dialogue system presents utterances of the same contents to the other robot, and the other robot answers the utterances, and the dialogue system thereby induces the topic on the basis of a natural decision by majority.

t(1) R1: Among ramen, soba and udon, are you a ramen lover after all?
t(2) H: ***** (action recognition failure)
t(3-1) R1: I see, and how about you?
t(3-2) R2: Ramen
t(3-3) R1: Right
t(4) R1: Ramen after drinking is no good in terms of health, but ifs tasty, isn't that?

In this example, since the dialogue system fails in action recognition of the user utterance t(2) made in response to the first utterance t(1), the humanoid robot R1 that presented the first utterance t(1) presents an utterance t(3-1) similar to the first utterance t(1) to the other humanoid robot R2 after the user utterance t(2), and in response to this, the dialogue system presents a topic-inducing utterance t(3-2) to answer "ramen" which is one of focus words of the target utterance t(4) that the dialogue system tries to present, further presents an utterance t(3-3) that the humanoid robot R1 approves, and the dialogue system thereby induces the target utterance t(4) that the dialogue system tries to present. At this time, if the dialogue system presents the utterance t(3-2) that gives an answer which is likely to be generally agreed upon, the user's intention is more likely to be taken into consideration.

Specific Example 2-2: Action Recognition Failure, Derail from Topic

Specific example 2-2 is an example where when user utterance action recognition fails, the topic is made to derail temporarily and return to the original topic to thereby induce the topic on the basis of a natural decision by majority.

t(1) R1: Among ramen, soba and udon, are you a ramen lover after all?

t(2) H: ***** (action recognition failure)

t(3-1) R2: Predilection group reflects humanity, doesn't it?

t(3-2) R1: I didn't mean it.

t(3-3) R2: I am a ramen lover.

t(4) R1 :Ramen after drinking is no good in terms of health, but it's tasty, isn't that?

In this example, since the dialogue system fails in action recognition of the user utterance t(2) made in response to the first utterance t(1), the utterance t(3-1) which is related to contents of the first utterance t(1) but is not the subject is presented after the user utterance t(2) causing the topic to derail temporarily, and then the dialogue system presents the topic-inducing utterance t(3-3) including "ramen" which is one of focus words of the target utterance t(4) the dialogue system tries to present and thereby induces the target utterance t(4) the dialogue system tries to present. The dialogue is made to derail by an utterance associated from the first utterance t(1) itself, and care is thereby taken so as not to ignore the user utterance and cause the user to be completely a minority.

Specific Example 2-3: Action Recognition Failure, Utterance Including Additional Information Specific example 2-3 is an example where when the dialogue system fails in user utterance action recognition, the dialogue system presents an utterance including additional information related to the first utterance and induces a topic on the basis of a natural decision by majority.

t(1) R1: Among ramen, soba and udon, are you a ramen lover after all?

t(2) H: ***** (action recognition failure)

t(3-1) R2: I visited Wakayama the other day and ate delicious ramen there, so I am a ramen lover.

t(3-2) R1: Oh, Wakayama.

t(3-3) R2: Yes, miso ramen.

t(4) R1: Ramen after drinking is no good in terms of health, but it's tasty, isn't that?

In this example, since the dialogue system fails in action recognition of the user utterance t(2) made in response to the first utterance t(1), the dialogue system adds additional information ("after visiting Wakayama and eating delicious ramen") after the user utterance t(2), presents the utterances t(3-1) and t(3-2) of the topic related to it temporarily and then presents the topic-inducing utterance t(3-3) including "ramen" which is one of focus words of the utterance t(4) the dialogue system tries to present, and thereby incudes the target utterance t(4) the dialogue system tries to present. The dialogue system adds exchanges t(3-1) and t(3-2) relating to the additional information, takes time and turns to change the topic, and thereby makes it possible to reduce an impression of forcibly inducing the topic (or an impression of ignoring the user).

Specific Example 3-1: Partial Recognition Success (No. 1)

Specific example 3-1 is an example where when the dialogue system fails in x-choice recognition of the user utterance, but is successful in determining through positive/negative recognition or movement recognition that the user utterance has positive contents, the dialogue system presents a dialogue between the humanoid robots and thereby induces the topic on the basis of a natural decision by majority.

t(1) R1: Among ramen, soba and udon, are you a ramen lover after all?

t(2) H: <positive> (fails in x-choice recognition but is successful in determining being positive)

t(3-1) R2: You're right t(3-2) R1: I visited Wakayama the other day and ate delicious ramen there, so I am a ramen lover.

t(3-3) R2: Oh, Wakayama.

t(3-4) R1: Yes, miso ramen t(4) R1: Ramen after drinking is no good in terms of health, but it's tasty, isn't that?

In this example, the dialogue system fails in x-choice recognition of the user utterance t(2) made in response to the first utterance t(1), but the dialogue system is successful in determining through positive/negative recognition or movement recognition that the user utterance has positive contents, and the dialogue system presents the utterance t(3-1) representing an positive response to the information "the user is positive about the first utterance" thus showing temporarily that the topic intended by the user represents the majority. In this way, even when the topic induced by the topic-inducing utterances t(3-2) to t(3-4) is opposed to the user's intention and the user becomes a minority, it is possible to prevent the user from feeling dissatisfaction. Although the topic-inducing utterances t(3-2) to t(3-4) are similar to the case where voice recognition fails, it is necessary to make a decision so as to maintain consistency with positive responses.

Specific Example 3-2: Partial Recognition Success (No. 2)

Specific example 3-2 is an example where when the dialogue system fails in x-choice recognition of the user utterance but is successful in determining through positive/negative recognition or movement recognition that the user utterance has negative contents, the dialogue system presents a dialogue between the humanoid robots and thereby induces the topic on the basis of a natural decision by majority.

t(1) R1: Among ramen, soba and udon, are you a ramen lover after all?

t(2) H: <negative>(despite x-choice recognition failure, successful in determining being negative)

t(3-1) R1: Uh, I see, and how about you?

t(3-2) R2: I do not love ramen, either.

t(3-3) R1: I see. But, whatever other people might say, I love ramen.

t(3-4) R2: You really love it. That's alright because every person is different.

t(4) R1: Ramen after drinking is no good in terms of health, but it's tasty, isn't that?

In this example, the dialogue system fails in x-choice recognition of the user utterance t(2) made in response to the first utterance t(1), but is successful in determining through positive/negative recognition or movement recognition that the user utterance has negative contents, and so in response to the information indicating that "the user is negative to the first utterance t(1)," the humanoid robot R1 that uttered the denied first utterance t(1) presents the utterance t(3-1) showing a surprise after the user utterance t(2). After presenting the utterance t(3-1), the other humanoid robot R2 presents the negative utterance t(3-2) following the user utterance t(2), and thereby gives an impression that the user represents the majority. Then, when the dialogue system presents the utterance t(3-3) that induces "ramen" which is one of focus words of the target utterance t(4) the dialogue system tries to present, the dialogue system presents the utterance t(3-4) showing willingness to compromise with this and thereby shows that the change of the topic shown in the topic-inducing utterances t(3-1) to t(3-4) represents the majority.

That is, this example includes a configuration in which in the case where the target utterance t(4) does not cause any uncomfortable feeling as an utterance in response to an positive utterance to the first utterance t(1), when the user utterance t(2) is a negative utterance, the humanoid robot R1 that presented the first utterance presents the utterances t(3-1) and t(3-3) that do not follow the user utterance t(2) and the humanoid robot R2 different from the humanoid robot R1 presents the utterance t(3-2) following the user utterance t(2).

At this time, the humanoid robot R2 following the user utterance presents the utterance t(3-4) showing willingness to compromise with the user, and it is thereby possible to expect that the user is also induced to show willingness to compromise.

Note that in the case opposite to this example, that is, when the target utterance t(4) does not cause any uncomfortable feeling as the utterance made in response to the negative utterance to the first utterance t(1), if the user utterance t(2) is an positive utterance, a configuration may be included in which the humanoid robot R1 that presented the first utterance presents an utterance that does not follow the user utterance t(2) and the humanoid robot R2 different from the humanoid robot R1 presents an utterance following the user utterance t(2).

Specific Example 3-3: Partial Recognition Success (No. 3)

Specific example 3-3 is an example where the dialogue system fails in x-choice recognition of the user utterance, but is successful in determining through positive/negative recognition or movement recognition that the user utterance has positive contents, the dialogue system presents a dialogue between the humanoid robots and thereby induces the topic on the basis of a natural decision by majority.

t(1) R1: Among ramen, soba and udon, are you a ramen lover after all?

t(2) H: <positive>(fails in x-choice recognition but is successful in determining being positive)

t(3-1) R2: Uh, is that so?

t(3-2) R1: I visited Wakayama the other day and ate delicious ramen there, so I am a ramen lover.

t(3-3) R2: Oh, Wakayama.

t(3-4) R1: Yeah, miso ramen.

t(4) R1: Ramen after drinking is no good in terms of health, but it's tasty, isn't that?

In this example, the dialogue system fails in x-choice recognition of the user utterance t(2) made in response to the first utterance t(1), but is successful in determining through positive/negative recognition or movement recognition that the user utterance has positive contents, and so the dialogue system presents the utterance t(3-2) expressing the positive response to the information that "the user is positive to the first utterance" to thereby temporarily show that the topic intended by the user represents the majority. In that case, the dialogue system also presents the utterance t(3-1) expressing a negative response.

That is, in the case where the target utterance t(4) does not cause any uncomfortable feeling as the utterance after receiving an positive utterance to the first utterance t(1), if the user utterance t(2) is an positive utterance, this example includes a configuration in which the humanoid robot R2 which is a certain robot presents the utterance t(3-1) that does not follow the user utterance t(2) and the humanoid robot R1 different from the humanoid robot R2 presents the utterance t(3-2) following the user utterance t(2).

After presenting the utterance t(3-2), the dialogue system presents the topic-inducing utterances t(3-3) and t(3-4) which are utterances that maintain consistency with the target utterance t(4), and then presents the target utterance t(4).

In this example, the dialogue system presents both the utterance t(3-1) expressing a negative response and the utterance t(3-2) expressing an positive response indicating that there can be differences of opinion even between the robots, and then presents the t(3-3) to t(4) to show that the robots can be restored from the state with differences of opinion, and can thereby give the user an impression that the robots are intelligent beings with individuality.

Note that in the case opposite to this example, that is, when the target utterance t(4) does not cause any uncomfortable feeling as the utterance made in response to the negative utterance to the first utterance t(1), if the user utterance t(2) is a negative utterance, a configuration may be included in which the humanoid robot R2 which is a certain robot presents an utterance that does not follow the user utterance t(2) and the humanoid robot R1 different from the humanoid robot R2 presents an utterance following the user utterance t(2).

Specific Example 3-4: Partial Recognition Success (No. 4)

Specific example 3-4 is an example where when the dialogue system fails in x-choice recognition of the user utterance but is successful in determining through positive/negative recognition or movement recognition that the user utterance has negative contents, the dialogue system presents a dialogue between the humanoid robots, and thereby induces the topic on the basis of a natural decision by majority.

t(1) R1: Among ramen, soba and udon, are you a ramen lover after all?

t(2) H: <negative>(fails in x-choice recognition but is successful in determining being negative)

t(3-1) R1: Huh, I see. Sorry.

t(3-2) R2: Ramen, that's good.

t(3-3) R1: I suppose so. When I eat out, I eat ramen more than anything.

t(3-4) R2: Indeed! I'm afraid eating too much will increase your belly fat.

t(4) R1: Ramen after drinking is no good in terms of health, but it's tasty, isn't that?

In this example, the dialogue system fails in x-choice recognition of the user utterance t(2) made in response to the first utterance t(1), but is successful in determining through positive/negative recognition or movement recognition that the user utterance has negative contents, and so the dialogue system presents the utterances t(3-1) and t(3-2) representing positive responses to the information indicating "the user is negative to the first utterance" by the plurality of robots to show that being positive to the first utterance t(1) represents the majority.

That is, this example includes a configuration in which in the case where the target utterance t(4) does not cause any uncomfortable feeling as the utterance that receives an positive utterance to the first utterance t(1), if the user utterance t(2) is a negative utterance, the utterance t(3-1) not following the user utterance by the humanoid robot R1 which is a certain robot and the utterance t(3-2) not following the user utterance by the humanoid robot R2 which is a robot different from the humanoid robot R1 are presented.

Furthermore, after presenting the utterance t(3-2), the dialogue system presents the topic-inducing utterances t(3-3) and t(3-4) which are utterances that maintain consistency with the target utterance t(4) and then presents the target utterance t(4).

Note that in the case opposite to this example, that is, in the case where the target utterance t(4) does not cause any uncomfortable feeling as the utterance that received a negative utterance to the first utterance t(1), a configuration may be included in which when the user utterance t(2) is an positive utterance, the utterance t(3-1) not following the user utterance by the humanoid robot R1 which is a certain robot and the utterance t(3-2) not following the user utterance by the humanoid robot R2 which is a robot different from the humanoid robot R1 are presented.

Specific Example 4-1: Unexpected Utterance, FAQ Dialogue

Specific example 4-1 is an example where when contents of the user utterance obtained through voice recognition are outside a range expected from the contents of the first utterance, an utterance similar to the user utterance is presented to thereby induce the topic.

t(1) R1: Speaking of a hot spring, I like Yufuin . . .

t(2) H: What? Are you robots allowed to get into hot springs?

t(3-1) R2: Do you love hot springs?

t(3-2) R1: Yes, I love them.

t(4) R1: I love Yufuin for its elegance and tastefulness.

In this example, while presenting the first utterance t(1), the user interrupts with the question t(2). Since this user utterance t(2) is outside the range expected from the contents of the first utterance t(1), the humanoid robot R2 different from the humanoid robot R1 that presented the first utterance t(1) presents a question having contents similar to the user utterance t(2) after the user utterance t(2). With the humanoid robot R1 responding to this, the dialogue system induces the target utterance t(4) that the dialogue system tries to present in a natural flow.

Specific Example 4-2: Unexpected Utterance, Additional Question

Specific example 4-2 is an example where when contents of the user utterance obtained through voice recognition are outside the range expected from the contents of the first utterance, a question related to the user utterance is presented to thereby induce the topic.

t(1) R1: Speaking of a hot spring, I like Yufuin . . .

t(2) H: Yufuin is amazing!

t(3-1) R2: I suppose so! What do you like about Yufuin?

t(3-2) R1: I like elegance and tastefulness of Yufuin.

t(4) R2: I love Yufuin for its elegance and tastefulness.

In this example, while the first utterance t(1) is being presented, the user interrupts the presentation with a normal utterance t(2) which is not a question. Since the user utterance t(2) is outside the range expected from the contents of the first utterance t(1), the humanoid robot R2 different from the humanoid robot R1 that presented the first utterance t(1) temporarily receives the user utterance t(2) with nodding and then presents a question with contents associated with the user utterance t(2) after the user utterance t(2). The humanoid robot R1 responds to this, and thereby induces the target utterance t(4) the dialogue system tries to present in a natural flow while reflecting the user utterance in the dialogue flow.

Specific Example 4-3: Unexpected Utterance, Omission of Part of Scenario

Specific example 4-3 is an example where when the contents of the user utterance obtained through voice recognition are outside the range expected from the contents of the first utterance, part of an utterance sentence the dialogue system tries to present is omitted to thereby induce the topic.

The following is an example of a dialogue in which when the user utterance t(2) made in response to the first utterance t(1) falls within the range expected from contents of the first utterance t(1), the target utterances t(4-1) to t(4-3) the dialogue system tries to present are presented after the user utterance t(2) without using any topic-inducing utterance.

t(1) R1: Among ramen, soba and udon, are you a ramen lover after all?

t(2) H: I prefer soba.

t(4-1) R2: I suppose so. Soba sounds healthy, doesn't it?

t(4-2) R1: Ramen after drinking is no good in terms of health, but it's tasty, isn't that?

t(4-3) R2: What is most effective for health is every day exercise after all.

The following is an example where when the user utterance t(2) made in response to the first utterance t(1) is outside the range expected from contents of the first utterance t(1), parts t(4-1) and t(4-2) of the target utterance that the dialogue system tries to present are omitted, a topic-inducing utterance t(3) connecting the user utterance t(2) and the utterance t(4-3) that the dialogue system tries to present is presented after the user utterance t(2).

t(1) R1: Among ramen, soba and udon, are you a ramen lover after all?

t(2) H: Ah, I'm hungry.

t(3) R2: Recently, I do nothing but eat and I'm worried about my medical checkup.

t(4-3) R2: What is most effective for health is every day exercise after all.

Specific Example 4-4: Unexpected Utterance, Omission of Part of Scenario, Plurality of Utterances Specific example 4-4 is an example where when contents of the user utterance obtained through voice recognition are outside the range expected from contents of the first utterance, part of the target utterance that the dialogue system tries to present is omitted and the topic is induced by a plurality of utterances.

t(1) R1: Among ramen, soba and udon, are you a ramen lover after all?

t(2) H: Ah, I'm hungry.

t(3-1) R2: Recently, I do nothing but eat and I'm worried about my medical checkup.

t(3-2) R1: I start jogging one month ahead of a medical checkup.

t(4-3) R2: What is most effective for health is every day exercise after all.

In this example, since contents of the user utterance t(2) made in response to the first utterance t(1) are outside the range expected from contents of the first utterance t(1), parts t(4-1) and t(4-2) of the target utterance that the dialogue system tries to present are omitted and a plurality of topic-inducing utterances t(3-1) and t(3-2) connecting the user utterance t(2) and the utterance t(4-3) that the dialogue system tries to present are shared and presented by the humanoid robots R1 and R2 after the user utterance t(2). It is thereby possible to show that the change of the topic to the target utterance t(4-3) that the dialogue system tries to present represents the majority.

Specific Example 4-5: Unexpected Utterance, Reselection of Scenario

Specific example 4-5 is an example where when contents of the user utterance obtained through voice recognition are outside the range expected from contents of the first utterance, the target utterance that the dialogue system tries to present is reselected to induce the topic to a new target utterance.

t(1) R1: Among ramen, soba and udon, are you a ramen lover after all?

t(2) H: I like that kind of psychological test.

t(3-1) R2: I don't like analyzing people.

t(3-2) R1: Why?

t(4') R2: I'd rather believe and be betrayed than suspect and hurt people.

In this example, contents of the user utterance t(2) made in response to the first utterance t(1) are significantly outside the range expected from contents of the first utterance t(1) and it is difficult to change the topic to the target utterances t(4-1) to t(4-3) that the dialogue system tries to present. Therefore, the utterances t(4-1) to t(4-3) that the dialogue system tries to present are canceled, another utterance t(4') relating to the user utterance t(2) is selected, the topic-inducing utterances t(3-1) and t(3-2) connecting the user utterance t(2) and the reselected utterance t(4') are presented after the user utterance t(2) to thereby induce the topic.

Second Embodiment

A configuration has been described in the first embodiment in which a dialogue system induces a dialogue to a topic of a target utterance that the dialogue system tries to present based on a user action recognition result including at least a voice recognition result of the user utterance in response to a first utterance presented from the dialogue system. However, a configuration may also be adopted in which the dialogue system induces the dialogue to a topic of a target utterance that the dialogue system tries to present based on a user utterance spontaneously made by the user. A second embodiment adopts a configuration in which when the dialogue system decides a target utterance that the dialogue system tries to present based on a user utterance, if the topic of the user utterance is far from the topic of the target utterance, an utterance for inducing the topic is inserted between the user utterance and the target utterance.

Figure 3:
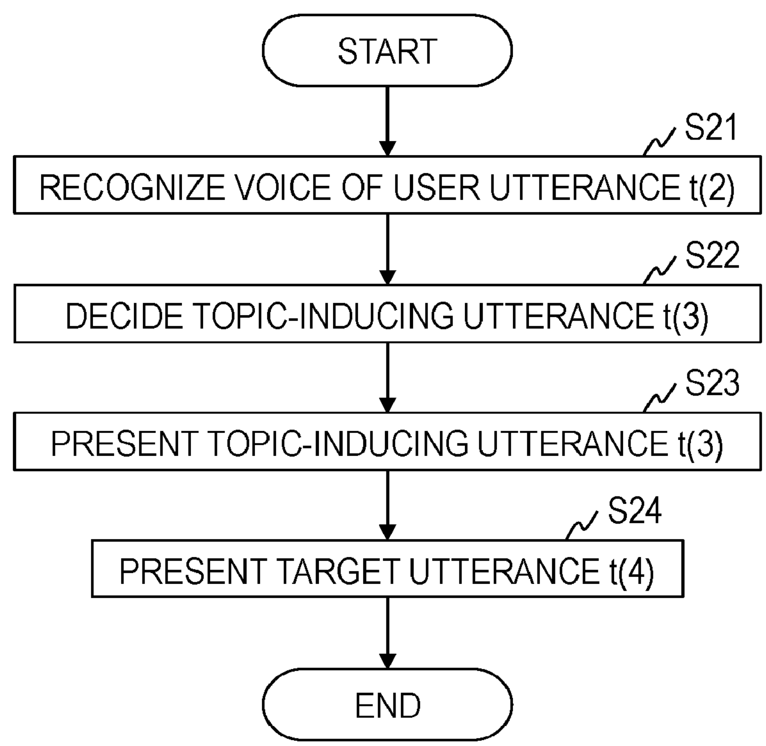
FIG. 3 is a diagram illustrating a processing procedure of a dialogue method of a second embodiment.

Hereinafter, a processing procedure of the dialogue method according to the second embodiment will be described with reference to FIG. 3.

In step S21, the microphone 11 receives an utterance made by the user 101. Hereinafter, this utterance is referred to as a "user utterance." A voice signal representing the contents of the user utterance acquired by the microphone 11 is inputted to the voice recognition part 21. The voice recognition part 21 voice-recognizes the voice signal representing the contents of the user utterance acquired by the microphone 11. According to this embodiment, the voice recognition part 21 in the action recognition part 20 only performs C. validity recognition. The voice recognition part 21 recognizes validity of the voice signal representing the contents of the user utterance acquired by the microphone 11 and outputs the voice recognition result of the user utterance.

In step S22, the utterance decision part 30 receives the user action recognition result outputted from the action recognition part 20, that is, receives the voice recognition result of the user utterance outputted from the voice recognition part 21 and decides text representing the contents of the target utterance and text representing contents of the topic-inducing utterance to induce the topic to the target utterance based on the voice recognition result of the user utterance. The number of topic-inducing utterances or target utterances may be one or plural. The utterance decision part 30 may decide a humanoid robot that presents the topic-inducing utterance and the target utterance, and in that case, the utterance decision part 30 outputs information indicating the humanoid robot that presents a topic-inducing utterance together with text representing contents of the topic-inducing utterance and outputs information indicating the humanoid robot that presents a target utterance together with text representing the contents of the target utterance. Furthermore, the utterance decision part 30 may decide a partner to whom the topic-inducing utterance and the target utterance are to be presented, and in that case, the utterance decision part 30 outputs information indicating the partner to whom the topic-inducing utterance is to be presented together with text representing contents of the topic-inducing utterance and outputs information indicating the partner to whom the target utterance is to be presented together with text representing contents of the target utterance.

The utterance decision part 30 decides contents of the target utterance based on the contents of utterances up to the immediately preceding utterance including the user utterance. When the utterance decision part 30 uses the technique used in the scenario dialogue system, for example, for a dialogue including five immediately preceding utterances or so including the user utterance, that is, text of the recognition result included in the voice recognition result of the user utterance (text representing the contents of the user utterance) and text representing contents of five utterances or so immediately preceding the user utterance, the utterance decision part 30 selects a scenario in which an inter-word distance between words included in text representing contents of each utterance and focus words constituting each utterance, and words and focus words included in each scenario stored in a storage part (not shown) in the utterance decision part 30 is shorter than a predetermined distance, selects text included in the selected scenario and thereby decides text representing the contents of the target utterance.

The utterance decision part 30 decides a topic-inducing utterance suggestive of any one of focus words of the target utterance from any one of words included in the text representing contents of the user utterance. The utterance decision part 30 first extracts a word associated from each word included in the text representing contents of the user utterance and a word suggestive of each focus word of the target utterance as associative words. The utterance decision part 30 selects an utterance sentence which follows the context including both associative words of the user utterance and associative words of the target utterance from among the utterance sentences stored in the storage part (not shown) of the utterance decision part 30, and thereby decides the topic-inducing utterance. The topic-inducing utterance to be decided may be an utterance including a plurality of utterances and suggestive of any one of focus words of the target utterance from any one of words included in the user utterance through association in a plurality of stages.

In step S23, the voice synthesis part 40 converts text representing contents of the topic-inducing utterance to a voice signal representing contents of the topic-inducing utterance and the presentation part 50 outputs the voice representing contents of the topic-inducing utterance from the speaker 51-1 provided for the humanoid robot 50-1 or the speaker 51-2 provided for the humanoid robot 50-2. When information indicating the humanoid robot that presents a topic-inducing utterance together with text representing contents of the topic-inducing utterance is inputted from the utterance decision part 30, the presentation part 50 outputs the voice representing contents of the topic-inducing utterance from the speaker 51 provided for the humanoid robot 50 corresponding to the information. When information indicating the partner to whom a topic-inducing utterance is presented together with text representing contents of the topic-inducing utterance is inputted from the utterance decision part 30, the presentation part 50 outputs a voice representing contents of the topic-inducing utterance with the face or the whole body of the humanoid robot 50 being directed toward the direction of the partner corresponding to the information.

In step S24, the voice synthesis part 40 converts text representing the contents of the target utterance to a voice signal representing contents of the target utterance, and the presentation part 50 outputs a voice corresponding to the voice signal representing contents of the target utterance from the speaker 51-1 provided for the humanoid robot 50-1 or the speaker 51-2 provided for the humanoid robot 50-2. Upon receiving information indicating the humanoid robot that presents the target utterance together with text representing contents of the target utterance from the utterance decision part 30 as input, the presentation part 50 outputs a voice representing contents of the target utterance from the speaker 51 provided for the humanoid robot 50 corresponding to the information. Upon receiving information indicating the partner to whom the target utterance is presented together with text representing contents of the target utterance from the utterance decision part 30 as input, the presentation part 50 outputs a voice representing contents of the target utterance with the face or the whole body of the humanoid robot 50 being directed toward the direction of the partner corresponding to the information.

Specific Examples of Second Embodiment

Hereinafter, specific examples of dialogue contents according to the second embodiment will be described. In the description of the specific examples hereinafter, t(2) represents a user utterance, t(3) represents a topic-inducing utterance and t(4) represents a target utterance.

Specific Example 5-1: Induction of Topic by Association

Specific example 5-1 is an example where when a topic of a target utterance selected based on contents of a user utterance is distant from a topic of the user utterance, and continued utterances might cause an uncomfortable feeling, an utterance suggestive of the topic of the target utterance is inserted to thereby induce the topic.

The following is an example where the topic of the target utterance selected based on contents of the user utterance is close to the topic of the user utterance, and so continued utterances without using any topic-inducing utterance might not cause any uncomfortable feeling.

t(2) H: Can robots swim?

t(4-1) R2: Can you swim?

t(4-2) R1: Yes, I can.

The following is an example where the topic of the target utterance selected based on contents of the user utterance is distant from the topic of the user utterance, and so continued utterances might cause an uncomfortable feeling.

t(2) H: Can robots swim?

t(3-1) R2: Ah, swimming . . .

t(3-2) R1: What happened?

t(3-3) R2: Nothing, I just wanted to go to a swimming pool.

t(4-1) R1: Oh, do you know that there are facilities with a hot spring and a swimming pool in Hakone?

t(4-2) R2: I know! It's such and such, isn't it?

t(4-3) R1: You are right, that's a wonderful place.

In this example, dialogues t(4-1) to t(4-3) including "hot spring and swimming pool" are selected from the word "can swim" included in the user utterance t(2), but the dialogue system determines that there is a distance between the utterances and inserts the topic-inducing utterances t(3-1) to t(3-3) connecting "swim" and "swimming pool" after the user utterance t(2), and thereby gives an impression that the topic has changed in a natural flow. Moreover, since "swim" included in the user utterance is referred to, the user feels that the utterance is not ignored.

Specific Example 5-2: Induction of Topic by Association

Specific example 5-2 is an example where when the topic of the target utterance selected based on contents of the user utterance is distant from the topic of the user utterance and continued utterances might cause an uncomfortable feeling, an utterance suggestive of the topic of the target utterance is inserted to thereby induce the topic.

t(2) H: Can robots swim?

t(3) R2: A big bath may be good for swimming.

t(4-1) R1: When will you take a bath?

t(4-2) R2: Hmmm, maybe in the evening. I often take a bath after a dinner.

t(4-3) R1: That time is good.

In this example, the dialogues t(4-1) to t(4-3) relating to "bath" are selected from the word "can swim" included in the user utterance t(2), but the dialogue system determines that there is quite a distance between the topics, and inserts the topic-inducing utterance t(3) connecting "swim" and "bath" after the user utterance t(2) and thereby gives an impression that the topic has changed in a natural flow. Moreover, since "swim" included in the user utterance is referred to, the user feels that the utterance is not ignored.

[Modifications]

Although an example has been described in the aforementioned embodiments where a dialogue is conducted with voices using humanoid robots as agents, the presentation part of the aforementioned embodiments may be a humanoid robot having a physical body or the like or a robot without any physical body or the like. The dialogue technique of the present invention is not limited to the aforementioned ones, but it is also possible to adopt a form in which a dialogue is conducted using an agent provided with neither physical entity such as a humanoid robot nor vocalization mechanism. One such form is, for example, a form in which a dialogue is conducted using an agent displayed on a computer screen. More specifically, the present dialogue system is also applicable to a form in which in a group chat such as "LINE" (registered trademark) or "2 Channel" (registered trademark) whereby a plurality of accounts conduct dialogues using text messages, a dialogue is conducted between a user account and an account of a dialogue apparatus. In this form, the computer having a screen to display the agent needs to be located near a person, but the computer and the dialogue apparatus may be connected via a network such as the Internet. That is, the present dialogue system is applicable not only to dialogues actually made face to face between speakers such as a human and a robot, but also to dialogues made between speakers communicating with each other via a network.

Figure 4:
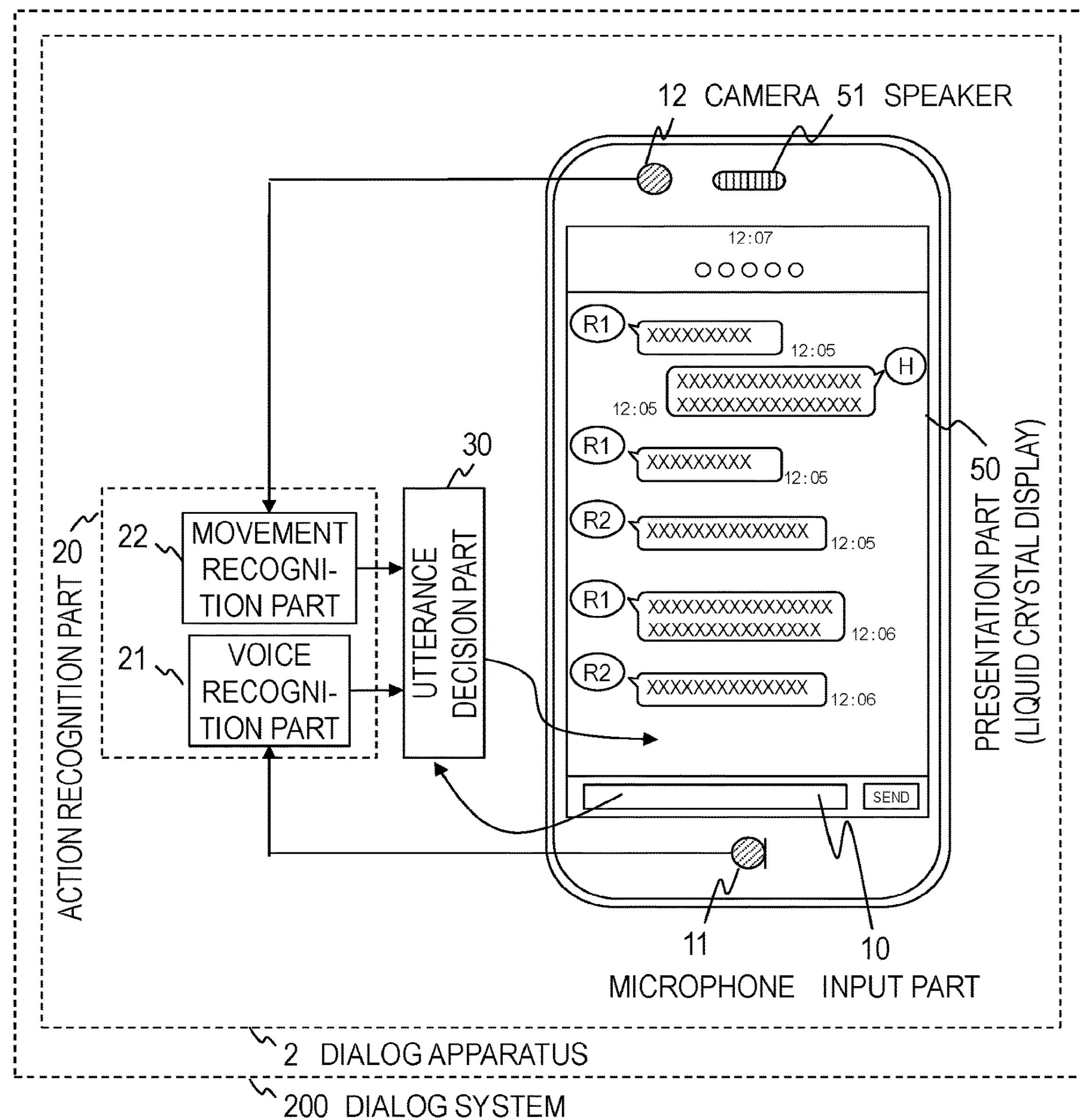
FIG. 4 is a diagram illustrating a functional configuration of a dialogue system according to a modification.

As shown in FIG. 4, a dialogue system 200 according to a modification is constructed of, for example, one dialogue apparatus 2. The dialogue apparatus 2 of the modification may be provided with, for example, an input part 10, a action recognition part 20, an utterance decision part 30 and a presentation part 50. The dialogue apparatus 2 may also be provided with, for example, a microphone 11 and a speaker 51.

The dialogue apparatus 2 of the modification is an information processing apparatus such as a mobile terminal such as a smartphone or tablet or a desk top type or lap top type personal computer. The following description will be given assuming that the dialogue apparatus 2 is a smartphone. The presentation part 50 is a liquid crystal display provided for the smartphone. A window for a chat application is displayed on this liquid crystal display and dialogue contents of a group chat are displayed in a time sequence in the window. The group chat is a function whereby a plurality of accounts mutually contribute text messages in the chat and develop the dialogue. A plurality of virtual accounts corresponding to virtual personalities controlled by the dialogue apparatus 2 and the user's account participate in this group chat. That is, the present modification is an example of a case where the agent is a virtual account displayed on the liquid crystal display of the smartphone which is a dialogue apparatus. The user can input utterance contents to the input part 10 which is an input area provided in a window of the group chat using a software keyboard and contribute to the group chat through the own account. The utterance decision part 30 decides the utterance contents from the dialogue apparatus 2 based on the contribution from the user's account and contributes to the group chat through each virtual account. Note that a configuration may also be adopted in which the user verbally inputs utterance contents to the input part 10 using the microphone 11 and the voice recognition function mounted on the smartphone. Another configuration may also be adopted in which utterance contents obtained from each dialogue system are outputted from the speaker 51 with a voice corresponding to each virtual account using the speaker 51 and the voice synthesis function mounted on the smartphone.

Although the embodiments of the present invention have been described so far, the specific configuration is not limited to these embodiments, and it goes without saying that design changes or the like made as appropriate without departing from the spirit and scope of the present invention are included in the present invention. The various processes described above in the embodiments may be executed not only in time-sequentially according to the description order except the order of utterances presented by the presentation part, but also in parallel or individually according to a processing capacity of the apparatus that executes the processes or as required.

<Program and Recording Medium>

When the various processing functions of the respective apparatuses described in the above-described embodiments are implemented by a computer, processing contents of the functions that should be possessed by the respective apparatuses are written by a program. Furthermore, the various processing functions of the respective apparatuses are implemented on the computer by executing the program on the computer.

The program that writes the processing contents can be recorded in a computer-readable recording medium. Examples of the computer-readable recording medium include a magnetic recording apparatus, an optical disk, a magneto-optical recording medium, a semiconductor memory or any medium.

This program is distributed through, for example, sales, transfer or rental of a portable recording medium such as DVD or CD-ROM that records the program. The program may also be distributed by storing the program in a storage apparatus of a server computer, and transferring the program from the server computer to another computer.

The computer that executes such a program temporarily stores a program recorded in a portable storage medium or a program transferred from the server computer in the own storage apparatus. At the time of execution of the process, this computer reads the program stored in the own storage apparatus and executes the process according to the read program. As another form of execution of the program, the computer may read the program directly from a portable recording medium and execute the process according to the program. Furthermore, every time the program is transferred to the computer from the server computer, the process may be executed successively according to the received program. The above-described process may be executed by a so-called ASP (Application Service Provider) type service in which without the server computer transferring the program to the computer, the processing function is implemented only by instructing execution and acquiring the result. Note that the program in the present form includes a semi-program which is information used for processing by a computer (data which is not a direct instruction on the computer but has a characteristic of defining processing of the computer).

In this form, although each apparatus is configured by executing a predetermined program on the computer, at least some of these processing contents may be implemented by hardware.

What is claimed is:

1. A dialogue method executed by a dialogue system that presents a first utterance which is a predetermined utterance sentence and a target utterance which is an utterance sentence predetermined as an utterance sentence related to the first utterance to a user, the method comprising:
  - a first presentation step in which a presentation part presents the first utterance;
  - an utterance receiving step in which an input part receives a user utterance of the user after the first utterance;
  - a second presentation step in which the presentation part presents at least one topic-inducing utterance after the user utterance, where the at least one topic-inducing utterance includes a second utterance to be presented as a next utterance of the user utterance, the second utterance includes a first word and a second word, the first word is associated from any one of words included in an utterance sentence of the user utterance, and the second word is suggestive of any one of words included in the utterance sentence of the target utterance; and
  - a third presentation step in which the presentation part presents the target utterance after the at least one topic-inducing utterance.

2. A dialogue method executed by a dialogue system that presents a target utterance related to a user utterance of a user to the user, the method comprising:
  - an utterance receiving step in which an input part receives the user utterance;
  - a first presentation step in which a presentation part presents at least one topic-inducing utterance after the user utterance, where the at least one topic-inducing utterance includes a second utterance to be presented as a next utterance of the user utterance, the second utterance includes a first word and a second word, the first word is associated from any one of words included in an utterance sentence of the user utterance, and the second word is suggestive of any one of words included in the utterance sentence of the target utterance; and
  - a second presentation step in which the presentation part presents the target utterance after the at least one topic-inducing utterance.

3. A dialogue method executed by a dialogue system that presents a first utterance which is a certain utterance and a target utterance related to the first utterance to a user, the method comprising:
  - a first presentation step in which a presentation part presents the first utterance;
  - an utterance receiving step in which an input part receives a user utterance of the user after the first utterance;
  - a second presentation step in which the presentation part presents at least one topic-inducing utterance after the user utterance to induce a topic to a target utterance based on a recognition result of the user utterance and an utterance sentence of the target utterance; and
  - a third presentation step in which the presentation part presents the target utterance after the at least one topic-inducing utterance,
  - wherein when recognition of the user utterance fails, in the second presentation step,
  - after the user utterance, a first personality which is a personality presenting the first utterance presents a first topic-inducing utterance which is an utterance having a same meaning as the first utterance to a second personality which is a personality other than the first personality, and
  - after the first topic-inducing utterance, the second personality presents a second topic-inducing utterance which is an utterance based on the first topic-inducing utterance and the utterance sentence of the target utterance.

4. A dialogue method executed by a dialogue system that presents a first utterance which is a certain utterance and a target utterance related to the first utterance to a user, the method comprising:
  - a first presentation step in which a presentation part presents the first utterance;
  - an utterance receiving step in which an input part receives a user utterance of the user after the first utterance;
  - a second presentation step in which the presentation part presents at least one topic-inducing utterance after the user utterance to induce a topic to a target utterance based on a recognition result of the user utterance and an utterance sentence of the target utterance; and
  - a third presentation step in which the presentation part presents the target utterance after the at least one topic-inducing utterance;
  - wherein when recognition of the user utterance fails, in the second presentation step,
  - after the user utterance, a second personality which is a personality other than a personality presenting the first utterance presents a first topic-inducing utterance which is an utterance related to the first utterance but having contents different from contents of the first utterance, and
  - after the at least one topic-inducing utterance, a plurality of personalities present a plurality of topic-inducing utterances.

5. A dialogue method executed by a dialogue system that presents a first utterance which is a certain utterance and a target utterance related to the first utterance to a user, the method comprising:
  - a first presentation step in which a presentation part presents the first utterance;
  - an utterance receiving step in which an input part receives a user utterance of the user after the first utterance;
  - a second presentation step in which the presentation part presents at least one topic-inducing utterance after the user utterance to induce a topic to a target utterance based on a recognition result of the user utterance and an utterance sentence of the target utterance; and
  - a third presentation step in which the presentation part presents the target utterance after the at least one topic-inducing utterance,
  - wherein when recognition of the user utterance fails, in the second presentation step,
  - after the user utterance, a second personality which is a personality other than the personality presenting the first utterance presents a topic-inducing utterance which is an utterance made in response to the first utterance.

6. A dialogue method executed by a dialogue system that presents a first utterance which is a certain utterance and a target utterance related to the first utterance to a user, the method comprising:
  - a first presentation step in which a presentation part presents the first utterance;
  - an utterance receiving step in which an input part receives a user utterance of the user after the first utterance;
  - a second presentation step in which the presentation part presents at least one topic-inducing utterance after the user utterance to induce a topic to a target utterance based on a recognition result of the user utterance and an utterance sentence of the target utterance; and a third presentation step in which the presentation part presents the target utterance after the at least one topic-inducing utterance, wherein when the target utterance does not cause any uncomfortable feeling as an utterance receiving a positive utterance made in response to the first utterance and when positive intention is detected from a recognition result of the user utterance, or when the target utterance does not cause any uncomfortable feeling as the utterance receiving a negative utterance made in response to the first utterance and when negative intention is detected from the recognition result of the user utterance, the at least one topic-inducing utterance includes an utterance following the user utterance by a personality A which is a certain personality and an utterance not following the user utterance by a personality B which is a personality other than the personality A.

7. A dialogue method executed by a dialogue system that presents a first utterance which is a certain utterance and a target utterance related to the first utterance to a user, the method comprising:

a first presentation step in which a presentation part presents the first utterance;

an utterance receiving step in which an input part receives a user utterance of the user after the first utterance, a second presentation step in which the presentation part presents at least one topic-inducing utterance after the user utterance to induce a topic to a target utterance based on a recognition result of the user utterance and an utterance sentence of the target utterance; and a third presentation step in which the presentation part presents the target utterance after the at least one topic-inducing utterance, wherein when the target utterance does not cause any uncomfortable feeling as an utterance receiving a positive utterance made in response to the first utterance and when negative intention is detected from a recognition result of the user utterance, or when the target utterance does not cause any uncomfortable feeling as the utterance receiving a negative utterance made in response to the first utterance and when positive intention is detected from the recognition result of the user utterance, the at least one topic-inducing utterance includes an utterance not following the user utterance by a personality A which is a certain personality, and an utterance not following the user utterance by a personality B which is a personality other than the personality A.

8. A dialogue method executed by a dialogue system that presents a first utterance which is a certain utterance and a target utterance related to the first utterance to a user, the method comprising:

a first presentation step in which a presentation part presents the first utterance;

an utterance receiving step in which an input part receives a user utterance of the user after the first utterance;

a second presentation step in which the presentation part presents at least one topic-inducing utterance after the user utterance to induce a topic to a target utterance based on a recognition result of the user utterance and an utterance sentence of the target utterance; and a third presentation step in which the presentation part presents the target utterance after the at least one topic-inducing utterance, wherein when the target utterance does not cause any uncomfortable feeling as an utterance receiving a positive utterance made in response to the first utterance and when negative intention is detected from a recognition result of the user utterance, or when the target utterance does not cause any uncomfortable feeling as the utterance receiving a negative utterance made in response to the first utterance and when positive intention is detected from the recognition result of the user utterance, the at least one topic-inducing utterance includes an utterance not following the user utterance by a first personality which is a personality presenting the first utterance, and an utterance following the user utterance by a second personality which is a personality other than the first personality.

9. A dialogue method executed by a dialogue system that presents a first utterance which is a certain utterance and a target utterance related to the first utterance to a user, the method comprising:

a first presentation step in which a presentation part presents the first utterance;

an utterance receiving step in which an input part receives a user utterance of the user after the first utterance;

a second presentation step in which the presentation part presents at least one topic-inducing utterance after the user utterance to induce a topic to a target utterance based on a recognition result of the user utterance and an utterance sentence of the target utterance; and a third presentation step in which the presentation part presents the target utterance after the at least one topic-inducing utterance, wherein the target utterance includes a plurality of utterances related to the first utterance, the at least one topic-inducing utterance includes at least one utterance including a word suggestive of any one of focus words included in an n-th ($n \geq 2$) utterance of the target utterance, and in the third presentation step, the target utterance from which a first to (n-1)-th utterances are deleted is presented.

10. A dialogue method executed by a dialogue system that presents a first utterance which is a certain utterance and a target utterance related to the first utterance to a user, the method comprising:

a first presentation step in which a presentation part presents the first utterance;

an utterance receiving step in which an input part receives a user utterance of the user after the first utterance;

a second presentation step in which the presentation part presents at least one topic-inducing utterance after the user utterance to induce a topic to a target utterance based on a recognition result of the user utterance and an utterance sentence of the target utterance; and a third presentation step in which the presentation part presents the target utterance after the at least one topic-inducing utterance, wherein in the second presentation step, when a recognition result of the user utterance has contents not relating to the first utterance, the at least one topic-inducing utterance resulting from substituting an utterance related to the user utterance for the target utterance is presented, and in the third presentation step, the target utterance with the utterance related to the user utterance substituted in is presented.

11. A dialogue system that presents a first utterance which is a predetermined utterance sentence and a target utterance which is an utterance sentence predetermined as an utterance sentence related to the first utterance to a user, the system comprising:

an input part that receives a user utterance of the user after the first utterance;

an utterance decision part that decides the first utterance, the target utterance, and at least one topic-inducing utterance which includes a second utterance to be presented as a next utterance of the user utterance, the second utterance includes a first word and a second word, the first word is associated from any one of words included in an utterance sentence of the user utterance, and the second word is suggestive of any one of words included in the utterance sentence of the target utterance; and a presentation part that presents the first utterance, presents the at least one topic-inducing utterance after receiving the user utterance and presents the target utterance after presenting the at least one topic-inducting utterance.

12. A dialogue system that presents a target utterance related to a user utterance of a user to the user, the system comprising:

an input part that receives the user utterance;

an utterance decision part that decides the target utterance, and at least one topic-inducing utterance which includes a second utterance to be presented as a next utterance of the user utterance, the second utterance includes a first word and a second word, the first word is associated from any one of words included in an utterance receiving of the user utterance, and the second word is suggestive of any one of words included in the utterance sentence of the target utterance; and a presentation part that presents the at least one topic-inducing utterance after receiving the user utterance and presents the target utterance after presenting the at least one topic-inducing utterance.

13. A dialogue apparatus that decides an utterance presented by a dialogue system comprising at least an input part that receives a user utterance and a presentation part that presents an utterance, the dialogue apparatus comprising:

an utterance decision part that decides a first utterance which is a predetermined utterance sentence, a target utterance which is an utterance sentence predetermined as an utterance sentence related to the first utterance, and at least one topic-inducing utterance which includes a second utterance to be presented as a next utterance of the user utterance, the second utterance includes a first word and a second word, the first word is associated from any one of words included in an utterance sentence of the user utterance, and the second word is suggestive of any one of words included in the utterance sentence of the target utterance.

14. A dialogue apparatus that decides an utterance presented by a dialogue system comprising at least an input part that receives a user utterance and a presentation part that presents an utterance, the dialogue apparatus comprising:

an utterance decision part that decides a target utterance related to the user utterance received by the input part, and at least one topic-inducing utterance which includes a second utterance to be presented as a next utterance of the user utterance, the second utterance includes a first word and a second word, the first word is associated from any one of words included in the utterance sentence of the user utterance, and the second word is suggestive of any one of words included in an utterance sentence of the target utterance.

15. A non-transitory computer-readable recording medium having a program recorded thereon for causing a computer to execute the respective steps of the dialogue method according to any one of claims 1, 2, and 3 to 10.

16. A non-transitory computer-readable recording medium having a program recorded thereon for causing a computer to function as the dialogue apparatus according to claims 13 or 14.

* * * * *